(12) United States Patent
Hong et al.

(10) Patent No.: US 12,148,425 B2
(45) Date of Patent: Nov. 19, 2024

(54) ELECTRONIC DEVICE FOR PROCESSING USER UTTERANCE AND CONTROL METHOD THEREOF

(71) Applicant: Samsung Electronics Co., Ltd., Gyeonggi-do (KR)

(72) Inventors: Yeseul Hong, Gyeonggi-do (KR); Dayoung Lee, Gyeonggi-do (KR); Boram Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 321 days.

(21) Appl. No.: 17/718,970

(22) Filed: Apr. 12, 2022

(65) Prior Publication Data
US 2022/0328043 A1    Oct. 13, 2022

(30) Foreign Application Priority Data

Apr. 12, 2021 (KR) .................. 10-2021-0047310

(51) Int. Cl.
*G10L 15/22*     (2006.01)
*G06F 3/16*      (2006.01)
*G10L 25/78*     (2013.01)

(52) U.S. Cl.
CPC .............. *G10L 15/22* (2013.01); *G06F 3/167* (2013.01); *G10L 25/78* (2013.01); *G10L 2015/223* (2013.01)

(58) Field of Classification Search
CPC ......... G10L 15/22; G10L 15/00; G10L 15/06; G10L 15/063; G10L 15/065; G10L 15/07;
(Continued)

(56) References Cited

U.S. PATENT DOCUMENTS 9,865,267 B2   1/2018 Du et al.
10,417,405 B2  9/2019 Cheyer
(Continued)

FOREIGN PATENT DOCUMENTS

CN    104575504    4/2015
CN    109637548    4/2019
(Continued)

OTHER PUBLICATIONS

Lee Ki-beom, "AI Speaker meets Marvel Characters . . . Launch of U+AI Avengers", http://www.bloter.net/archives/334107, Mar. 25, 2019, pp. 2.
(Continued)

*Primary Examiner* — Qi Han
(74) *Attorney, Agent, or Firm* — The Farrell Law Firm, P.C.

(57) ABSTRACT

An electronic device is provide that may identify voiceprint data corresponding to a user from among at least one piece of voiceprint data, based on received user voice data, identify a general voice instruction included in the received user voice data, determine user preference information of the user, based on the identified voiceprint data, determine a control action for determining an action to be performed in at least one external device or the electronic device, based on the general voice instruction identified from the received user voice data, determine a personalized voice instruction, based on at least one of the control action or the user preference information, and transmit, to the at least one external device, through the communication circuit, an audio signal corresponding to the personalized voice instruction to be output by the at least one external device, or output the audio signal through a speaker included in the electronic device.

20 Claims, 17 Drawing Sheets

(58) Field of Classification Search
CPC ....... G10L 15/08; G10L 15/085; G10L 15/18;
G10L 15/1815; G10L 15/1822; G10L
15/183; G10L 15/20; G10L 15/26; G10L
15/285; G10L 2015/0631–0638; G10L
2015/221–228
USPC .... 704/275, 270.1, 270, 257, 231, 243, 246,
704/250
See application file for complete search history.

(56) References Cited

U.S. PATENT DOCUMENTS

| | | | |
|---|---|---|---|
| 10,872,609 | B2 | 12/2020 | Sugiyama et al. |
| 10,923,130 | B2 | 2/2021 | Choi et al. |
| 2003/0119492 | A1* | 6/2003 | Timmins ........... H04M 3/42068 455/445 |
| 2015/0254057 | A1* | 9/2015 | Klein ................. H04N 21/4668 704/275 |
| 2017/0358317 | A1* | 12/2017 | James .................. H04W 12/30 |
| 2019/0027138 | A1 | 1/2019 | Wang et al. |
| 2019/0172467 | A1 | 6/2019 | Kim et al. |
| 2020/0035241 | A1 | 1/2020 | Chang |
| 2020/0043502 | A1 | 2/2020 | Ding |
| 2020/0075006 | A1* | 3/2020 | Chen ....................... G10L 15/22 |
| 2020/0304862 | A1 | 9/2020 | Cwik |
| 2020/0320995 | A1 | 10/2020 | Min et al. |
| 2021/0097158 | A1 | 4/2021 | Lee et al. |

FOREIGN PATENT DOCUMENTS

| | | |
|---|---|---|
| JP | 6719741 | 7/2020 |
| KR | 10-2135182 | 7/2020 |
| WO | WO 2019/054681 | 3/2019 |

OTHER PUBLICATIONS

Min Byung-kwon, [Tokyo Watch—K-Character Sweeping the World] President Po is on a Tour . . . K-Character Heyday, https://www.sedaily.com/NewsView/1VHXD7LXTT, Apr. 19, 2019-Apr. 20, 2019, pp. 12.
Naver TV Entertainment, "Cable and Terrestrial TV Overwhelm . . . Children's ratings", Feb. 5, 2009, pp. 2.
International Search Report dated Jul. 6, 2022 issued in counterpart application No. PCT/KR2022/005311, 8 pages.

* cited by examiner

ELECTRONIC DEVICE FOR PROCESSING USER UTTERANCE AND CONTROL METHOD THEREOF

CROSS-REFERENCE TO RELATED APPLICATION(S)

This application is based on and claims priority under 35 U.S.C. § 119 to Korean Patent Application No. 10-2021-0047310, filed on Apr. 12, 2021, in the Korean Intellectual Property Office, the entire disclosure of which is incorporated herein by reference.

BACKGROUND

1. Field

The disclosure relates generally to user voice command recognition and performing an operation corresponding to the recognized user voice command.

2. Description of Related Art

An artificial intelligence (AI) system (or integrated intelligence system) is a computer system that implements human-level intelligence, in which a machine learns and judges on its own, and the more it is used, the more the recognition rate improves. AI technology includes machine learning (e.g., deep learning) technology that uses algorithms for classifying/learning the characteristics of input data by itself and element technology that uses machine learning algorithms to simulate functions such as cognition and judgment of the human brain.

The element technologies may include linguistic understanding technology to recognize human languages/characters, visual understanding technology to recognize objects as if seen by the human eyes, reasoning/prediction technology to logically reason and predict by judging information, knowledge expression technology to process human experience information into knowledge data, and/or motion control technology to control autonomous driving of a vehicle and motion of a robot. Among the above-described element technologies, linguistic understanding is a technology for recognizing, applying, and processing human languages/characters, and includes natural language processing, machine translation, a dialogue system, question and answer, voice recognition/synthesis, etc.

An electronic device equipped with the AI system may analyze voice data input by the user utterance and determine a function to be executed by the electronic device or an external electronic device connected to the electronic device, based on the analyzed result. In addition, it is possible to support the control action to be performed in the electronic device or the external electronic device.

Recently, the number of electronic devices equipped with AI systems providing voice recognition functions has increased. An electronic device, which recognizes a spoken command, may provide services to the user by executing a function provided in the electronic device (e.g., an application installed in the electronic device), and also provide related services through various third party service providers. These voice recognition services are being developed based on technologies for processing natural language. The natural language processing technologies recognize the intention of a spoken command and provide a result that matches the intention to the user. For example, electronic devices that provide a voice recognition function may provide various services to a user by executing a function provided in the electronic device. However, there is a disadvantage that makes it difficult for a user to fully understand how to use the service. In addition, it is common that predetermined voice instructions must be spoken in order to use various voice recognition services.

Further, when it is necessary to speak a predetermined voice instruction in order to execute a function of the voice recognition service, it is often difficult for users to control a device based on a voice command personalized for each user.

While a user who often uses a voice recognition service may learn instructions that can be continuously performed in spoken voice commands, thereby increasing the usability of the voice recognition service, this learning curve is generally inconvenient.

Additionally, even with the same text-to-speech (TTS) command, it may be necessary to provide different services depending on the situation of the user using the voice recognition service.

SUMMARY

The disclosure is made to address at least the above-mentioned problems and/or disadvantages and to provide at least the advantages described below.

Accordingly, an aspect of the disclosure is to provide an electronic device and an operating method thereof, which output a voice instruction for using a voice recognition service as an audio signal to familiarize a user with the voice recognition service.

Another aspect of the disclosure is to provide an electronic device and an operating method thereof, wherein a voice recognition service may be used through a personalized voice instruction corresponding to a general voice instruction, based on user preference information, so that each user is able to control a device, based on the personalized voice instruction, thereby improving usability.

Another aspect of the disclosure is to provide an electronic device and an operating method thereof, which provide a voice recognition service based on status information associated with a user using a voice recognition service, thereby improving the accuracy of the voice recognition service, compared to provision of a voice recognition service based only on a spoken command.

Another aspect of the disclosure is to provide an electronic device and an operating method thereof, which perform an authentication operation in relation to at least one external device, based on voice data of a user, thereby providing a concise voice recognition service.

In accordance with an aspect of the disclosure, an electronic device is provided, which includes a memory configured to store at least one piece of voiceprint data corresponding to at least one user, a communication circuit configured to communicate with at least one external device, and at least one processor electrically connected to the memory and the communication circuit, wherein the at least one processor is configured to identify voiceprint data corresponding to the user from among the at least one piece of voiceprint data, based on received user voice data, identify a general voice instruction included in the received user voice data, determine user preference information of the user, based on the identified voiceprint data, determine a control action for determining an action to be performed in the at least one external device or the electronic device, based on the general voice instruction identified from the received user voice data, determine a personalized voice instruction, based on at least one of the control action or the user preference information, and transmit, through the communication circuit, to the at least one external device, an audio signal corresponding to the personalized voice instruction to be output by the at least one external device, or output the audio signal through a speaker included in the electronic device.

In accordance with an aspect of the disclosure, a method is provided for an electronic device including a memory configured to store at least one piece of voiceprint data corresponding to at least one user and a communication circuit configured to communicate with at least one external device. The method includes receiving user voice data, identifying the voiceprint data corresponding to the user, based on received user voice data from among the at least one piece of voiceprint data, identifying a general voice instruction included in the received user voice data, determining user preference information of the user, based on the identified voiceprint data, determining a control action based on an action to be performed in the at least one external device or the electronic device, based on the general voice instruction, determining a personalized voice instruction, based on at least one of the control action or the user preference information, and transmitting, to the at least one external device, through the communication circuit, an audio signal corresponding to the personalized voice instruction to be output by the at least one external device, or outputting the audio signal through a speaker included in the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
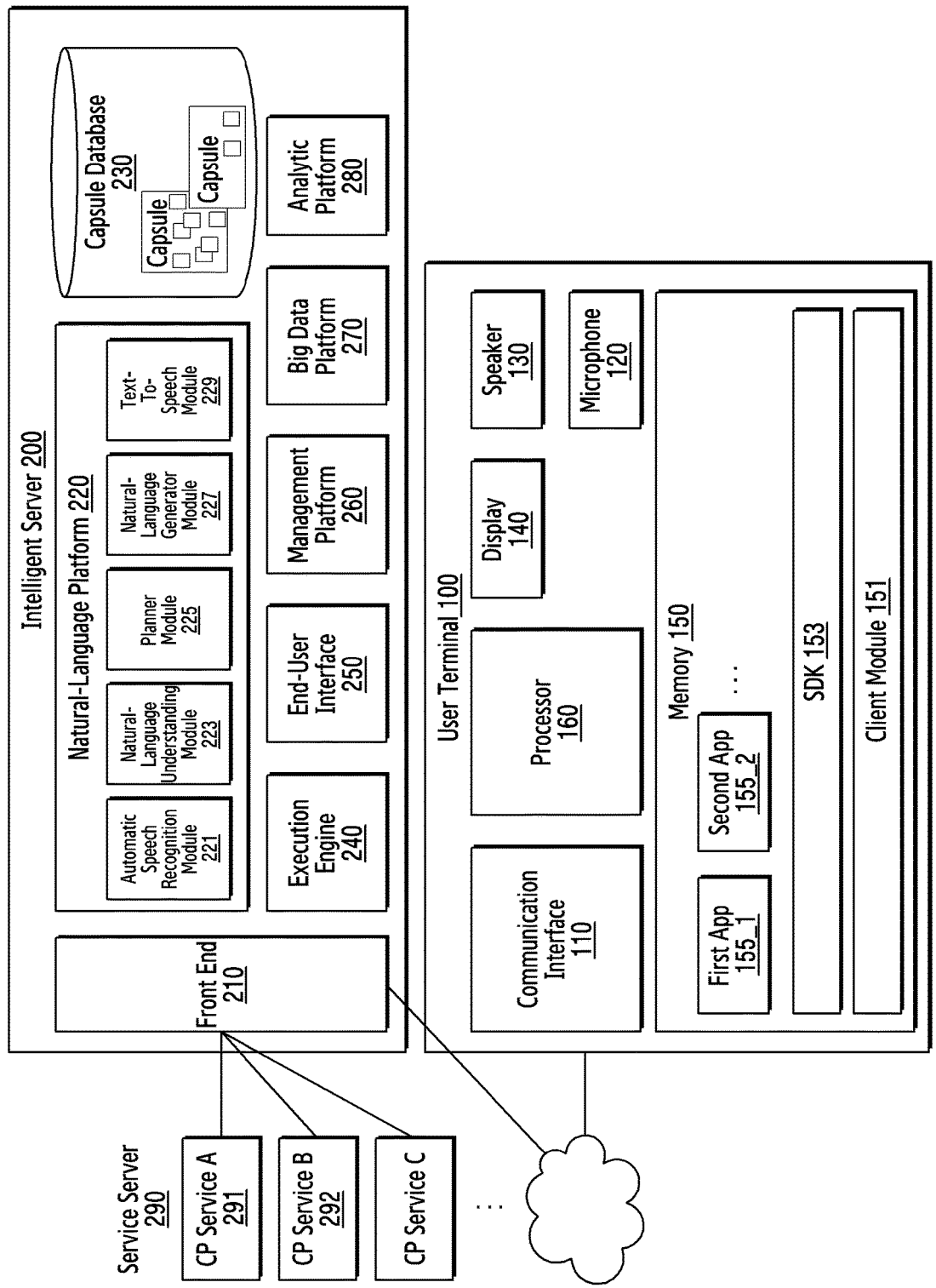
FIG. 1 illustrates an integrated intelligence system according to an embodiment.

Hereinafter, various embodiments of the disclosure will be described with reference to the accompanying drawings. In the following description, specific details, such as detailed configuration and components, are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

In describing the drawings, similar reference numerals may be used to designate similar elements.

FIG. 1 illustrates an integrated intelligence system according to an embodiment.

Referring to FIG. 1, the integrated intelligent system includes a user terminal 100, an intelligent server 200, and a service server 290.

The user terminal 100 may be a terminal device (or an electronic device) connectable to the Internet, e.g., a mobile phone, a smartphone, a personal digital assistant (PDA), a notebook computer, a television (TV), a home appliance, a wearable device, a head mounted device (HMD), or a smart speaker.

the user terminal 100 includes a communication interface 110, a microphone 120, a speaker 130, a display 140, a memory 150, and a processor 160. The elements listed above may be operatively or electrically connected to each other.

The communication interface 110 may be configured to be connected to an external device so as to transmit and receive data. The microphone 120 may receive a sound (e.g., the user utterance) and convert the same into an electrical signal. The speaker 130 may output the electrical signals as sounds (e.g., voices). The display 140 may be configured to display images or videos. The display 140 may also display a graphic user interface (GUI) of an executed application (or app).

The memory 150 stores a client module 151, a software development kit (SDK) 153, and a plurality of apps. The client module 151 and/or the SDK 153 may configure a framework (or a solution program) for executing general functions. In addition, the client module 151 or the SDK 153 may configure a framework for processing voice input.

The plurality of apps may include programs for performing specified functions. The plurality of apps include a first app 155_1 and a second app 155_3. Each of the plurality of apps may include a plurality of actions for performing specified functions. For example, the apps may include an alarm app, a message app, and/or a schedule app. The plurality of apps may be executed by the processor 160 to sequentially execute at least some of the plurality of actions.

The processor 160 may control the overall operation of the user terminal 100. For example, the processor 160 may be electrically connected to the communication interface 110, the microphone 120, the speaker 130, and/or the display 140 to perform specified actions. The processor 160 may include multiple processors.

The processor 160 may also execute programs stored in the memory 150 to perform specified functions. For example, the processor 160 may execute at least one of the client module 151 and the SDK 153 to perform operations for processing voice input. The processor 160 may control the operations of the plurality of apps through the SDK 153. The operations described herein as the operations of the client module 151 or the SDK 153 may be performed by the processor 160.

The client module 151 may receive voice input. the client module 151 may receive a voice signal corresponding to the user utterance detected through the microphone 120. The client module 151 may transmit the received voice input (e.g., the voice signal) to the intelligent server 200. The client module 151 may transmit status information of the user terminal 100 to the intelligent server 200 together with the received voice input. The status information may include execution status information of an app.

The client module 151 may receive a result corresponding to the received voice input. For example, if the intelligent server 200 is able to produce a result corresponding to the received voice input, the client module 151 may receive the result corresponding to the received voice input. The client module 151 may display the received result on the display 140.

The client module 151 may receive a plan corresponding to the received voice input. The client module 151 may display, on the display 140, results of executing a plurality of actions of an app according to the plan. For example, the client module 151 may sequentially display the results of executing a plurality of actions on the display. Alternatively, the user terminal 100 may only display some results of executing a plurality of actions (e.g., a result of the last action) on the display.

The client module 151 may receive a request for obtaining information required to calculate the result corresponding to the voice input from the intelligent server 200. The client module 151 may transmit the required information to the intelligent server 200 in response to the request.

The client module 151 may transmit information on the result of executing a plurality of actions according to the plan to the intelligent server 200. The intelligent server 200 may identify that the received voice input is correctly processed using the result information.

The client module 151 may include a voice recognition module. The client module 151 may recognize a voice input performing limited functions through the voice recognition module. For example, the client module 151 may perform an organic operation in response to a specified voice input (e.g., "wake up!"), thereby executing an intelligent app for processing the voice input.

The intelligent server 200 may receive information related to a user voice input from the user terminal 100 through a communication network. The intelligent server 200 may convert data related to the received voice input into text data.

The intelligent server 200 may produce at least one plan for performing a task corresponding to the user voice input, based on the text data.

The plan may be produced by an AI system. The AI system may be a rule-based system or may be a neural network-based system (e.g., a feedforward neural network (FNN) and/or a recurrent neural network (RNN)). Alternatively, the AI system may be a combination of the above-described systems or may be another AI system.

The plan may be selected from a predefined group of plans or may be produced in real time in response to a user request. For example, the AI system may select at least one plan from among a plurality of predefined plans.

The intelligent server 200 may transmit a result according to the produced plan to the user terminal 100 or transmit the produced plan to the user terminal 100. The user terminal 100 may display the result according to the plan on the display. The user terminal 100 may display the result of executing operations according to the plan on the display.

The intelligent server 200 includes a front end 210, a natural-language platform 220, a capsule database 230, an execution engine 240, an end-user interface 250, a management platform 260, a big data platform 270, and an analytic platform 280.

The front end 210 may receive a voice input from the user terminal 100. The front end 210 may transmit a response corresponding to the voice input to the user terminal 100.

The natural-language platform 220 includes an automatic speech recognition (ASR) module 221, an NLU module 223, a planner module 225, a natural-language generator (NLG) module 227, and a TTS module 229.

The ASR module 221 may convert a voice input received from the user terminal 100 into text data. The NLU module 223 may recognize the user's intention using text data of the voice input. For example, the NLU module 223 may recognize the user's intention by performing syntactic analysis or semantic analysis. The NLU module 223 may recognize the meaning of a word extracted from the voice input using linguistic features (e.g., grammatical elements) of a morpheme or phrase, and may determine the user's intention by matching the recognized meaning of the word to the intention.

The planner module 225 may produce a plan using the intention and parameters determined in the NLU module 223. The planner module 225 may determine a plurality of domains required to perform tasks, based on the determined intention. The planner module 225 may determine a plurality of actions included respective domains determined based on the intention. The planner module 225 may determine the parameters required to execute the plurality of determined actions or result values output by execution of the plurality of actions. The parameters and the result values may be defined as concepts in specified formats (or classes). The plan may include a plurality of actions and/or a plurality of concepts determined by the user's intention.

The planner module 225 may determine a relationship between the plurality of actions and the plurality of concepts in stages (or hierarchically). For example, based on a plurality of concepts, the planner module 225 may determine the execution order of the plurality of actions determined based on the user's intention. That is, the planner module 225 may determine the execution order of the plurality of actions, based on the parameters required for executing the plurality of actions and the results output by execution of the plurality of actions. Accordingly, the planner module 225 may produce a plan including correlation information (e.g., ontology) between the plurality of actions and the plurality of concepts.

The planner module 225 may produce a plan using information stored in the capsule database 230 in which a group of relationships between concepts and actions is stored.

The NLG module 227 may convert specified information into a text form. The information converted into the text form may be in the form of natural language speech. The TTS module 229 may convert information in the form of text into information in the form of a voice.

Some or all of the functions of the natural-language platform 220 may be implemented in the user terminal 100.

The capsule database 230 may store information on the relationship between a plurality of concepts and actions corresponding to a plurality of domains. The capsule may include a plurality of action objects (or action information) and concept objects (or concept information) included in the plan. The capsule database 230 may store a plurality of capsules in the form of a concept action network (CAN). A plurality of capsules may be stored in a function registry included in the capsule database 230.

The capsule database 230 may include a strategy registry that stores strategy information required for determining a plan corresponding to a voice input. If there is a plurality of plans corresponding to a voice input, the strategy information may include reference information for determining one plan. The capsule database 230 may include a follow-up registry that stores information on the subsequent actions for suggesting subsequent actions to the user in a specified situation. The subsequent actions, for example, may include subsequent speech.

The capsule database 230 may include a layout registry that stores layout information for information output through the user terminal 100. The capsule database 230 may include a vocabulary registry that stores vocabulary information included in the capsule information. The capsule database 230 may include a dialog registry that stores information on the dialog (or interaction) with the user.

The capsule database 230 may update the stored objects through a developer tool. The developer tool may include a function editor for updating the action objects or the concept objects. The developer tool may include a vocabulary editor for updating the vocabulary. The developer tool may include a strategy editor for producing and registering strategies that determine the plan. The developer tool may include a dialog editor for producing the dialog with the user. The developer tool may include a follow-up editor capable of activating subsequent goals and editing subsequent speech that provide hints. The subsequent goals may be determined based on a currently set goal, user preferences, or an environmental condition. Alternatively, the capsule database 230 may also be implemented in the user terminal 100.

The execution engine 240 may produce a result using the produced plan. The end-user interface 250 may transmit the produced result to the user terminal 100. Accordingly, the user terminal 100 may receive the result and provide the received result to the user.

The management platform 260 may manage information used in the intelligent server 200. The big data platform 270 may collect user data. The analysis platform 280 may manage the quality of service (QoS) of the intelligent server 200. For example, the analytic platform 280 may manage the elements and processing speed (or the efficiency) of the intelligent server 200.

The service server 290 may provide specified services (e.g., ordering food or hotel reservation) to the user terminal 100. The service server 290 may be a server operated by a third party. The service server 290 may provide information for producing the plan corresponding to the received voice input to the intelligent server 200. The provided information may be stored in the capsule database 230. In addition, the service server 290 may provide result information according to the plan to the intelligent server 200.

In the integrated intelligence system described above, the user terminal 100 may provide various intelligent services to the user in response to a user input. The user input may include an input through physical buttons, a touch input, or a voice input.

The user terminal 100 may provide a voice recognition service through an intelligent app (or a voice recognition app) stored therein. In this case, the user terminal 100 may recognize user speech (or a voice input) received through a microphone and provide a service corresponding to the recognized voice input to the user.

The user terminal 100 may perform specified actions itself or in conjunction with the intelligent server and/or service server, based on the received voice input. For example, the user terminal 100 may execute an app corresponding to the received voice input and perform a specified action through the executed app.

In the case in which the user terminal 100 provides a service together with the intelligent server 200 and/or service server, the user terminal may detect a user utterance using the microphone 120 and generate a signal (or voice data) corresponding to the detected user utterance. The user terminal may transmit the voice data to the intelligent server 200 using the communication interface 110.

The intelligent server 200 may produce, as a response to the voice input received from the user terminal 100, a plan for performing a task corresponding to the voice input or a result of executing an action according to the plan. The plan may include a plurality of actions for performing the task corresponding to the user voice input and/or a plurality of concepts related to the plurality of actions. The concept may define parameters input to execute the plurality of actions or result values output by execution of the plurality of actions. The plan may include correlation information between the plurality of actions and/or the plurality of concepts.

The user terminal 100 may receive the response using the communication interface 110. The user terminal 100 may output voice signals generated inside the user terminal 100 to the outside using the speaker 130 or output images produced inside the user terminal 100 to the outside using the display 140.

Figure 2:
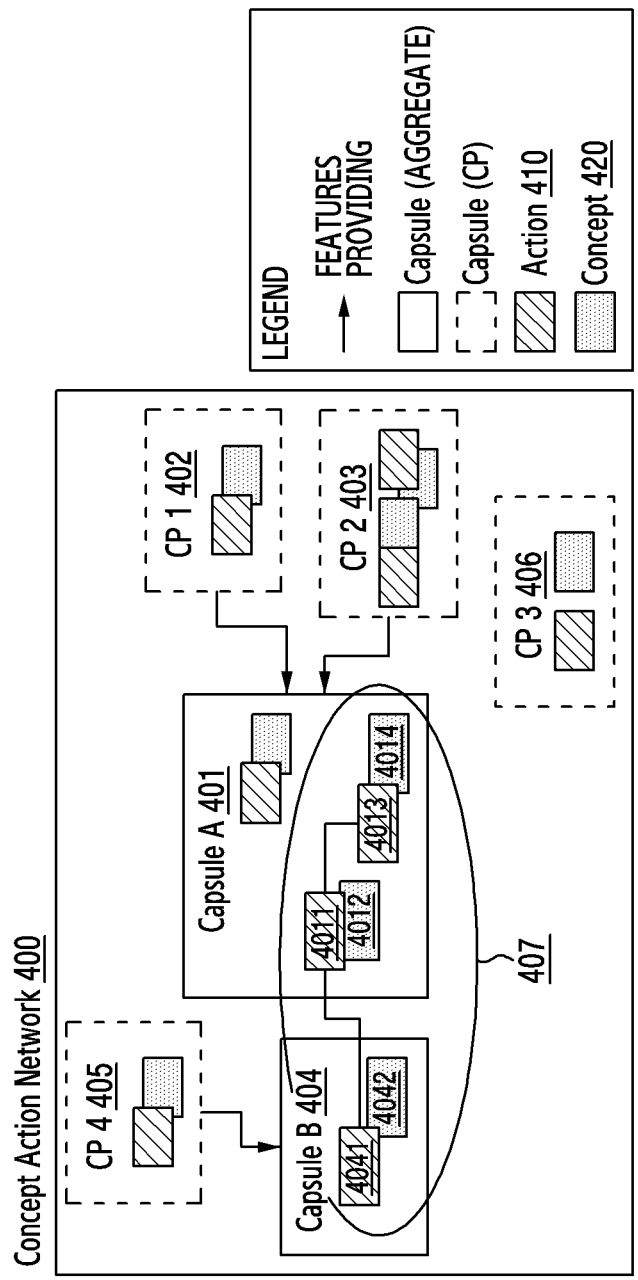
FIG. 2 illustrates correlation information between concepts and actions stored in a database according to an embodiment.

FIG. 2 illustrates correlation information between concepts and actions stored in a database according to an embodiment.

Referring to FIG. 2, a capsule database (e.g., the capsule database 230) of an intelligent server may store capsules 401 to 406 in the form of a concept action network (CAN) 400. The capsule database may store actions for processing tasks corresponding to user voice inputs and parameters required for the actions in the form of a CAN 400.

The capsule database may store the plurality of capsules (e.g., capsule A 401 and capsule B 404) corresponding to respective domains (e.g., applications). One of the capsules (e.g., the capsule A 401) may correspond to one domain (e.g., a location (geo) or an application). In addition, one of the capsules may correspond to at least one service provider (e.g., CP service A 291 or CP service B 292) for performing functions for the domain related to the capsule. One capsule may include one or more actions 410 and one or more concepts 420 for performing the specified functions.

The natural-language platform may produce a plan for performing the task corresponding to a received voice input using the capsule stored in the capsule database. For example, a planner module of the natural-language platform may produce a plan using the capsule stored in the capsule database. For example, the planner module may produce a plan 407 using actions 4011 and 4013 and concepts 4012 and 4014 in the capsule A 410, and an action 4041 and a concept 4042 in the capsule B 404.

Figure 3:
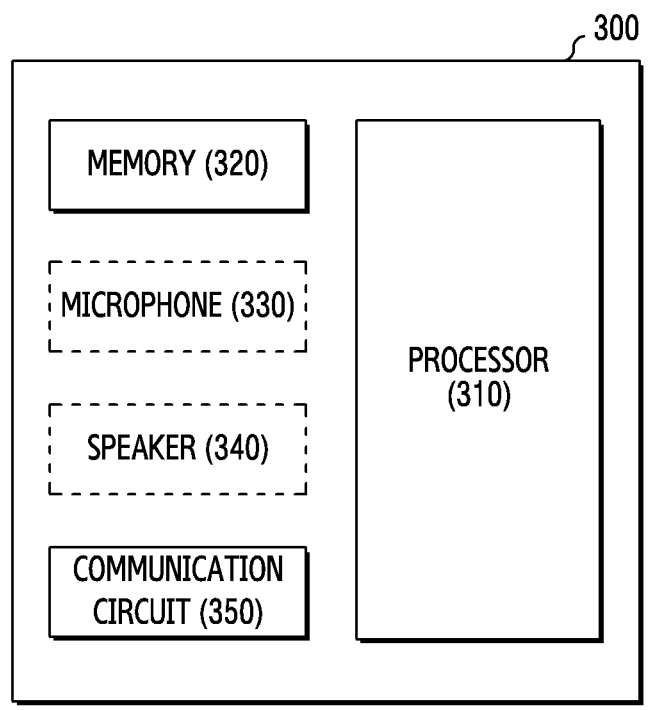
FIG. 3 illustrates an electronic device according to an embodiment.

FIG. 3 illustrates an electronic device according to an embodiment.

Referring to FIG. 3, an electronic device 300 (e.g., the user terminal 100, the intelligent server 200, or the service server 290 in FIG. 1) may include at least one processor 310, a memory 320, a microphone 330, a speaker 340, and a communication circuit 350. The electronic device 300 may be a user terminal, an intelligent server, or a service server. The configuration of the electronic device 300 may vary depending on whether the electronic device 300 is the server or the user terminal. For example, if the electronic device 300 is a service server, the electronic device 300 may include only the memory 320 and the communication circuit 350, but if the electronic device 300 is a user terminal, the electronic device 300 may also include the microphone 330 and the speaker 340.

The operations of the electronic device 300 may be performed in different ways depending on the configuration of the electronic device 300. For example, if the electronic device 300 does not include the microphone 330 and the speaker 340, the electronic device 300 may control an external device including a microphone and a speaker to perform the same operation using the communication circuit 350.

The elements included in the electronic device 300 may be operatively or electrically connected to each other. For example, some of the elements of the electronic device 300 illustrated in FIG. 3 may be modified or excluded, or other elements may be added thereto. The electronic device 300 may also include all or some of the elements of the user terminal 100 in FIG. 1. The electronic device 300 may communicate with an intelligent server 200 in FIG. 1 to perform operations by itself or in conjunction therewith.

The electronic device 300 may include all or some of the elements of the intelligent server 200 or the service server 290 in FIG. 1.

The processor 310 may be electrically or operatively connected to the memory 320, the microphone 330, the speaker 340, and the communication circuit 350. The processor 310 may execute, using instructions stored in the memory 320, control of at least one other element of the electronic device 300 and/or operations or data processing related to communication. The processor 310 may include a central processing unit (CPU), a graphics processing unit (GPU), a micro-controller unit (MCU), a sensor hub, a supplementary processor, a communication processor (CP), an application processor (AP), an application-specific integrated circuit (ASIC), and field programmable gate arrays (FPGAs), and/or a plurality of cores.

The processor 310 may receive a voice input by the user utterance through the microphone 330 and process the received voice input. The processor 310 may convert the received voice input into text data and perform a function corresponding to the received voice input, based on the text data. For example, the processor 310 may convert the received voice input into text data and perform a function corresponding to a general voice instruction or the personalized voice instruction extracted through the conversation. The processor 310 may output, through the speaker 340, voice data related to execution of a function in response to the received voice input. In order to perform the function described above, the processor 310 may include a voice recognition model and/or a hardware structure specialized in processing of instructions.

The electronic device 300 may receive user voice data including a general voice instruction. For example, the electronic device 300 may receive, through the communication circuit 350, voice data, which is obtained through a microphone of a user terminal.

The memory 320 may store the instructions for processing data for performing the operation of the electronic device 300 or for controlling the elements of the electronic device 300 during execution. The memory 320 may store at least one application that performs various functions. The memory 320 may store instructions and data related to processing of a voice input. For example, the instruction related to the processing of a voice input may cause, when executed by the processor 310, the processor 310 to perform a function related to the processing of the voice input, which is a function corresponding to the instruction.

The memory 320 may store a variety of information related to at least one user of the electronic device 300. The memory 320 may store data related to voice instructions. For example, the memory 320 may store voiceprint data corresponding to each of at least one user of the electronic device 300.

The processor 310 may identify the user of the electronic device 300 through voiceprint data.

In addition, the memory 320 may store voice instruction history information or age information corresponding to each of at least one user of the electronic device 300, or preference information input from each of the at least one user.

The memory 320 may store device information on each of at least one external device connected to the electronic device 300. For example, the memory 320 may store status information of at least one external device connected to the electronic device 300.

The microphone 330 may receive a user utterance and convert the same into an electrical signal. For example, the microphone 330 may receive a user utterance including a general voice instruction from at least one user of the electronic device 300 and convert the same into an electrical signal. The processor 310 may identify a general voice instruction received from the user using an electrical signal received through the microphone 330. The microphone 330 may receive a user utterance including a personalized voice instruction from at least one user of the electronic device 300 and convert the same into an electrical signal. The processor 310 may identify a voice instruction received from the user using an electrical signal received through the microphone 330.

The electronic device 300 may receive user voice data having been converted into an electrical signal using the communication circuit 350. User voice data may include a general voice instruction or a personalized voice instruction.

The speaker 340 may output a sound. For example, the speaker 340 may receive an electrical signal corresponding to voice data to be output from the processor 310, convert the received electrical signal into an audio signal, and output the same. The speaker 340 may receive electrical signals corresponding to a variety of voice data from the processor 310. The speaker 340 may receive an electrical signal corresponding to the personalized voice instruction from the processor 310 to convert the same into an audio signal and output the converted signal. The speaker 340 may receive an electrical signal corresponding to a notification related to execution of the functions of the electronic device 300 from the processor 310 to convert the same into an audio signal and output the converted signal.

The electronic device 300 may produce an audio signal and transmit the produced audio signal to the external device including a speaker using the communication circuit 350. For example, the processor 310 may transmit an audio signal corresponding to voice data to the external device through the communication circuit 350 so as to output the same.

The electronic device 300 may communicate with the intelligent server 200 and/or the service server 290 described with reference to FIG. 1 through the communication circuit 350. The electronic device 300 may transmit voice data based on a user utterance to the intelligent server 200 through the communication circuit 350. In addition, the electronic device 300 may receive a response from the intelligent server 200 using the communication circuit 350. The electronic device 300 may communicate with the user terminal 100 described with reference to FIG. 1 through the communication circuit 350.

The electronic device 300 may communicate with at least one external device connected to the electronic device 300 through the communication circuit 350. For example, the electronic device 300 may receive status information of the external device for each of at least one external device through the communication circuit 350. The processor 310 may produce a control signal for controlling at least one external device and transmit the control signal through the communication circuit 350.

The processor 310 may receive user voice data including a general voice instruction and identify voiceprint data corresponding to a user, based on the received user voice data. The processor 310 may use at least one piece of voiceprint data stored in the memory 320 in order to identify the voiceprint data. The processor 310 may determine the age of a user through a received voice. The processor 310 may identify voiceprint data through a received voice and determine the age of a user corresponding to the identified voiceprint data. The age of a user corresponding to the voiceprint data may be determined based on the characteristics of the user input data or voiceprint data. The age of a user may be classified in various ways, e.g., users may be divided by age into children and adults.

The processor 310 may determine user preference information, based on the identified voiceprint data. Preference information may be determined based on a variety of information. For example, the processor 310 may determine user preference information, based on voice instruction history information stored in the memory 320, age information, or preference information input from the user. If there is preference information input from the user, the processor 310 may determine user preference information, based on the same, and if there is no preference information input from the user, the processor 310 may determine user preference information, based on user's voice instruction history information. If there is no user voice instruction history information stored in the memory 320, the processor 310 may determine user preference information, based on age information of the user.

The processor 310 may receive a variety of information through an external server in order to determine user preference information, based on user age information. For example, the processor 310 may determine user preference information, based on a user preference information-based database for each age group or a viewer share-based database for each age group by time period, which is stored in the external server.

If a general voice instruction is received by a first utterance of the user using the electronic device 300, the processor 310 may not identify voiceprint data. In the case where the processor 310 is unable to identify the user's voiceprint data, the processor 310 may perform a limited operation. For example, if the operation corresponding to the general voice instruction requires security authentication, the processor 310 may perform only some operations due to the fact that the processor is unable to identify voiceprint data.

The processor 310 may determine a personalized voice instruction and a control action, based at least on the determined user preference information and the general voice instruction. The control action determined by the processor 310 may indicate a plan as described above.

The personalized voice instruction may indicate an instruction that performs an action corresponding to the general voice instruction. For example, the action performed based on the general voice instruction by the electronic device 300 and the action performed based on the personalized voice instruction by the electronic device 300 may include the same action. The personalized voice instruction may indicate the voice instruction corresponding to a general voice instruction in the theme that is determined based on user preference information of the user. The theme may include various types. For example, the theme may include various types, as well as animations, movies, entertainment programs, and/or celebrities.

The control action may indicate the operation to be performed by the electronic device 300, based on the general voice instruction received from the user. For example, if a general voice instruction "Tell me about today's schedule" is received from the user, the control action may indicate that the processor 310 of the electronic device 300 outputs an audio signal for today's schedule through the speaker 340, based on data on today's schedule, which is stored in the memory 320. The personalized voice instruction and the control action may be determined in various ways.

The processor 310 may output an audio signal corresponding to the determined personalized voice instruction through the speaker 340. For example, if a personalized voice instruction corresponding to a general voice instruction "Turn on the desk light" is "ABC", the processor 310 may output an audio signal corresponding to the statement "If you say ABC, you can turn on the desk light!" through the speaker 340.

Figure 4:
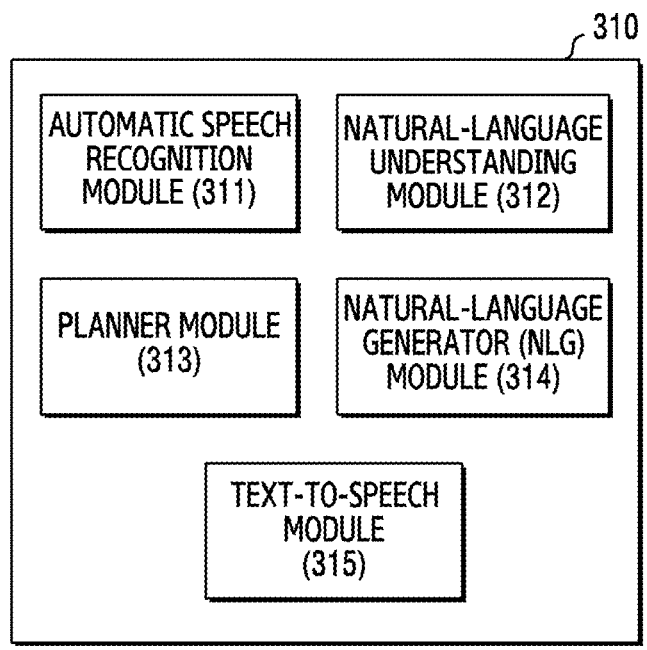
FIG. 4 illustrates an on-device natural-language understanding (NLU) platform according to an embodiment.

FIG. 4 illustrates an on-device NLU platform according to an embodiment.

Referring to FIG. 4, a processor 310 of the electronic device 300 may include an on-device NLU platform. For example, the processor 310 may implement an NLU platform, based on a program stored in the memory 320.

The processor 310 includes an ASR module 311, an NLU module 312, a planner module 313, an NLG module 314, and a TTS module 315. Hereinafter, the configuration of the processor 310 including the ASR module 311, the NLU module 312, the planner module 313, the NLG module 314, and the TTS module 315 may be expressed as an on-device NLU platform. The on-device NLU platform may process received user speech complementary to a natural-language platform. For example, the on-device NLU platform may process a voice input that may be processed by a natural-language platform.

An intelligent server may change the voice input processed by the on-device natural-language platform of the electronic device. A processor of the intelligent server may determine whether or not to change (or update) an NLU model used in the NLU module 312.

The ASR module 311, the NLU module 312, the planner module 313, and the TTS module 315 may be embedded modules to perform specified functions.

For example, an electronic device may process a voice input received through the ASR module 311, the NLU module 312, and the planner module 313. The ASR module 311, the NLU module 312, and the planner module 313 of the electronic device may process a voice input similarly to the ASR module 221, the NLU module 223, and the planner module 225 of the intelligent server 200 of FIG. 2 as described above.

The NLU module 312 may identify the intention of a received voice input. The NLU module 312 may identify an intention corresponding to the voice input using an NLU model. The electronic device may process a voice input corresponding to the intention through the ASR module 311, the NLU module 312, and the planner module 313.

The ASR module 311 may convert a voice input received through a microphone into text data. For example, the ASR module 311 may include a speech recognition module. The speech recognition module may include an acoustic model and a language model. The acoustic model may include information related to vocalization, and the language model may include unit phoneme information and information on a combination of unit phoneme information. The speech recognition module may convert a user utterance into text data using the information related to vocalization and the information related to unit phonemes.

The NLU module 312 may determine the user's intention using text data of the voice input. For example, the NLU module 312 may determine the user's intention by performing syntactic analysis or semantic analysis. The NLU module 312 may recognize the meaning of a word extracted from the text data using linguistic features (e.g., grammatical elements) of a morpheme or phrase, and may determine the user's intention by matching the recognized meaning of the word to the intention.

The planner module 313 may produce a plan using the intention and parameters determined in the NLU module 312. The planner module 313 may determine a plurality of domains required to perform tasks (or functions), based on the determined intention. The planner module 313 may determine a plurality of actions included respective domains determined based on the intention. The planner module 313 may determine the parameters required to execute the plurality of determined actions or result values output by execution of the plurality of actions. The parameters and the result values may be defined as concepts in specified formats (or classes). Accordingly, the plan may include a plurality of actions and/or a plurality of concepts determined by the user's intention.

The planner module 313 may determine a relationship between the plurality of actions and the plurality of concepts in stages (or hierarchically). For example, based on a plurality of concepts, the planner module 313 may determine the execution order of the plurality of actions determined based on the user's intention. That is, the planner module 313 may determine the execution order of the plurality of actions, based on the parameters required for executing the plurality of actions and the results output by execution of the plurality of actions. Accordingly, the planner module 313 may produce a plan including correlation information (e.g., ontology) between the plurality of actions and the plurality of concepts.

The NLG module 314 may convert specified information into a text form. The information converted to a text form may be in the form of a natural language utterance. The specified information may indicate completion of an action (or performing of a control action) corresponding to a voice input by a user utterance or information guiding an additional user input (e.g., feedback information on the user input). The specified information may include a personalized voice instruction corresponding to a general voice instruction of the user. Alternatively, the specified information may include a subsequent personalized instruction corresponding to a subsequent voice instruction that is expected after the user's general voice instruction. The information converted into the text form may be transmitted to the TTS module 315 and may be converted into information in a voice form.

The TTS module 315 may convert information in a text form into information in a voice form. For example, the TTS module 315 may convert text data into voice data. The TTS module 315 may receive information in a text form from the NLG module 314, convert the information in a text form into information in a voice form (voice data), and output the same to the speaker 340.

As described above, the processor 310 may convert a voice input received through microphone 330 into text data through the ASR module 311, recognize the user's intention using the text data converted through the NLU module 312, and determine a control action (or task) to be performed based on the user's intention recognized through the planner module 313. In addition, the processor 310 may output, through the speaker 340, a response to the user utterance corresponding to the voice input received through the microphone 330. For example, the processor 310 may convert information on a personalized voice instruction corresponding to a general voice instruction included in the voice input received into a text form through the NLG module 314, convert the information, having been converted into a text form, into voice data through the TTS module 315, and output the same, as the response, through a speaker. The personalized voice instruction may be determined based at least on user preference information of the user and a general voice instruction of the user.

Figure 5:
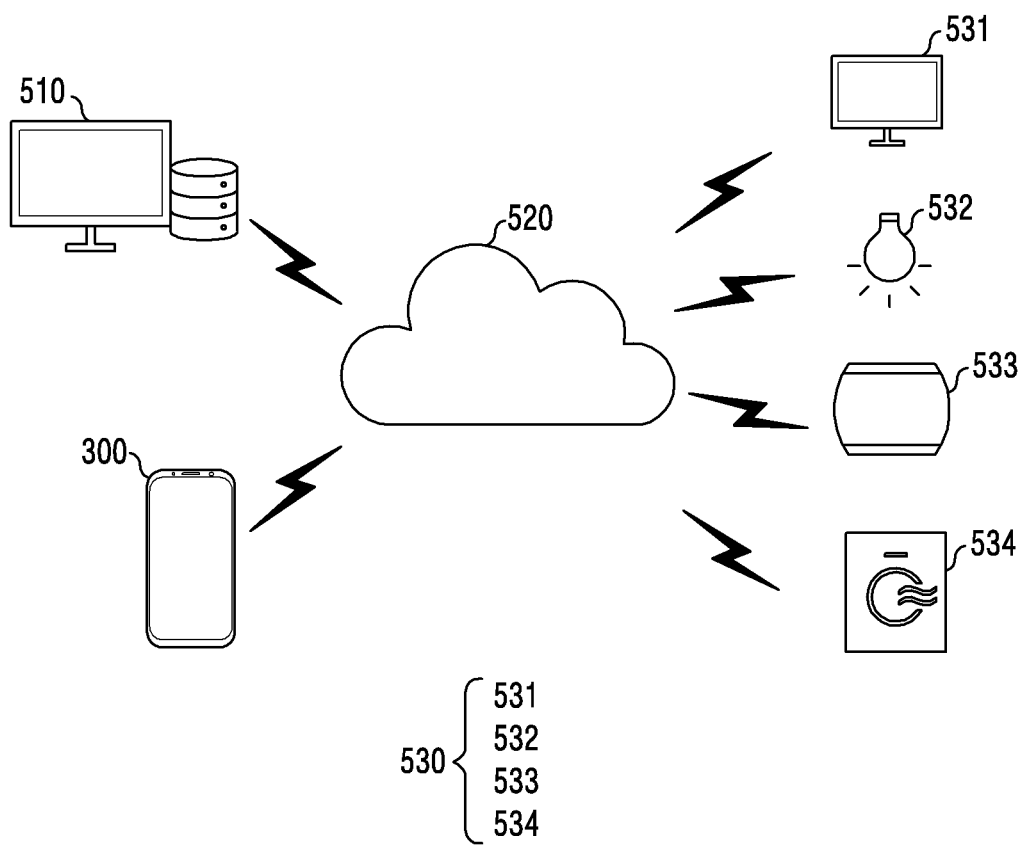
FIG. 5 illustrates a connection system between an electronic device and an external electronic device according to an embodiment.

FIG. 5 illustrates a connection system between an electronic device and an external electronic device according to an embodiment.

Referring to FIG. 5, a system includes at least one external device 530, a server 510, and an electronic device 300. At least one of the at least one external device 530 and the electronic device 300 may be connected to the server 510 through a system network 520 (e.g., Wi-Fi or a cellular network). at least one external devices 530 may be Internet-of-things (IoT) devices. The server 510 may be an intelligent server (e.g., the intelligent server 200 of FIG. 1) using machine learning and/or a neural network.

At least one external device 530 may be a user device. At least one external device 530 may include various devices. However, while FIG. 5 illustrates a TV 531, a lamp 532, a Bluetooth® speaker 533, and a home appliance (e.g., a washing machine) 534 as examples of various devices, the disclosure is not limited to these examples.

At least one external device 530 may be connected by an IoT hub device. The IoT hub device may perform voice recognition on a user voice input to control an IoT device to perform a control action. The electronic device 300 may correspond to an IoT hub device. Accordingly, when at least one external device 530 is initially connected to the electronic device 300, the electronic device 300 may store information about the type and location of the at least one external device 530.

At least one external device 530 may be connected to each other using a predetermined communication protocol. For example, the at least one external device 530 may be connected to the Bluetooth® speaker 533 through a short-range network. A network (e.g., a short-range network) for establishing a connection between the at least one external device 530 may be appropriately selected. For example, Bluetooth Low Energy (BLE), Wi-Fi direct, near-field communication (NFC), ultra-wide band (UWB) communication, or infrared (IR) communication may be used together with or instead of Bluetooth® to establish a connection between the at least one external device 530. In addition, at least one external device 530 may establish a connection using a mesh network (e.g., Zigbee or Z-Wave) as short-range wireless communication.

At least one of the external devices 531 to 534 may be directly connected to the server 510 through the system network 520. The external device 531 to 534 may be connected to each other in various ways depending on device information (e.g., device elements).

The electronic device 300 may transmit and receive data to and from at least one external device 530 through the communication circuit 350. The electronic device 300 may generate a control signal based on a general voice instruction received from the user and an additional control action determined through the processor 310. For example, the electronic device 300 may produce a plan, based on a general voice instruction received from the user and determine an additional control action. The electronic device 300 may generate a control signal based on the plan and additional control action, and transmit the control signal to an external device that is to perform an action according to the control signal, among the at least one external device 530. An external device receiving the control signal may perform actions according to the plan and additional control action, based on the control signal. For example, the electronic device 300 may receive a general voice instruction (e.g., "Turn on the TV") included in the user utterance and identify user preference information, based on the user's voiceprint data. The electronic device 300 may determine a personalized voice instruction and an additional control action corresponding to the general voice instruction, based on the user preference information. The electronic device 300 may generate a control signal, based on the general voice instruction and the additional control action, and transmit the control signal to an external device (e.g., the TV 531) to perform an action corresponding to the general voice instruction. According to an embodiment, the external device (e.g., the TV 531) having received the control signal may then perform an action corresponding to the additional control action (e.g., outputting configured background music and outputting a configured screen).

Figure 6:
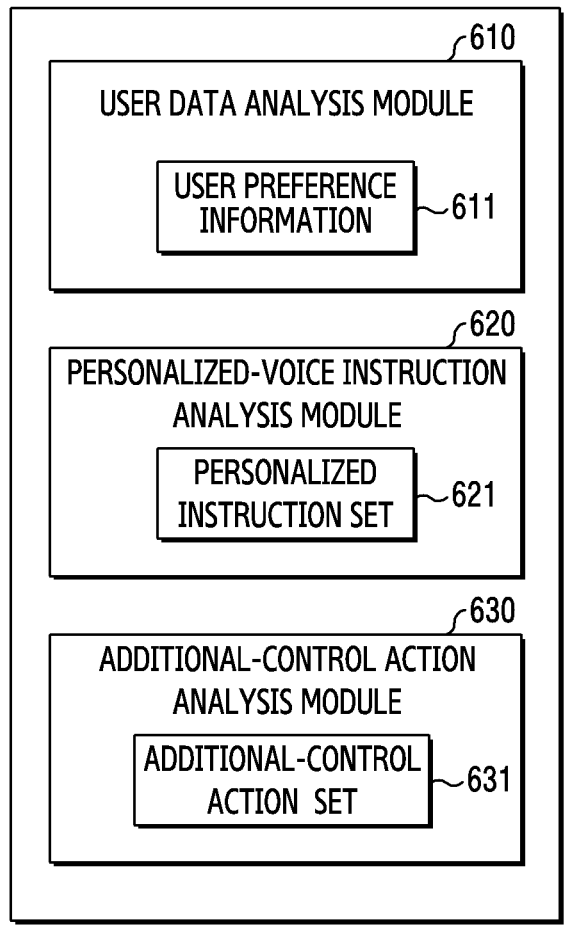
FIG. 6 illustrates modules related to a personalized voice instruction and an additional control action according to an embodiment.

FIG. 6 illustrates modules related to a personalized voice instruction and an additional control action according to an embodiment.

Referring to FIG. 6, a processor of an electronic device may include a user data analysis module 610, a personalized-voice instruction analysis module 620, and an additional-control action analysis module 630. The processor may implement the module, based on a program stored in a memory.

The user data analysis module 610 may determine user preference information 611 of a user using information (e.g., user data) stored in a memory. The user preference information 611 may include information about a user of the electronic device 300. For example, the user data may include voiceprint data of each user of the electronic device. In addition, the user preference information 611 may include voice instruction utterance and/or content reproduction history information of each of at least one user. the content reproduction history may include a reproduction history of various data. For example, the content reproduction history may include content reproduction histories using at least one external device 530. When a content reproduction action is performed through at least one external device 530, the processor 310 may store information on the content reproduction history in the memory 320. When the electronic device 300 receives an input of user preference information 611 from a user, the user preference information 611 may include preference information corresponding to each user. The user data is not limited to the examples described in the disclosure, and may include a variety of information, which may be a basis to determine user preference information 611.

If a general voice instruction is received from a user through a microphone, the processor may determine user preference information 611 of the user through the user data analysis module 610. For example, the user analysis module 610 may identify voiceprint data corresponding to the general voice instruction from among the voiceprint data of each of at least one user, which is stored in the user data 611. The user analysis module 610 may identify the user, based on the identified voiceprint data. If there is preference information input from a user, the user analysis module 610 may determine user preference information 611, based on the preference information.

Alternatively, the user analysis module 610 may determine user preference information 611, based on the voice instruction utterance and/or content reproduction history information corresponding to the user among the voice instruction utterance and/or content reproduction history information corresponding to at least one user. The voice instruction utterance information may include information about a control action used by the user or content uttered by the user. The content reproduction history information may include information on the content reproduced through at least one external device 530. For example, information on a TV program reproduced through a TV or on a sound source reproduced through a speaker may be included. If the preference information input from the user and voice instruction utterance and/or content reproduction history information are not included in the user preference information 611, the user analysis module 610 may determine user preference information 611, based on the age of the user analyzed through voiceprint data. For example, the user analysis module 610 may receive user preference information for each age group through the server and determine user preference information 611, based on the age of the user.

The personalized voice instruction analysis module 620 may determine a personalized voice instruction corresponding to the general voice instruction of the user, based on the user preference information 611 determined through the user data analysis module 610.

A memory may store a personalized instruction set 621. The personalized instruction set 621 may determine at least one theme and include at least one personalized voice instruction corresponding to each of the at least one theme. For example, the personalized instruction set 621 may include a list corresponding to each of at least one theme, and the list may include personalized voice instructions corresponding to various general voice instructions.

The personalized voice instruction analysis module 620 may receive a user input for configuring a personalized voice instruction corresponding to a general voice instruction. For example, the electronic device may configure a personalized voice instruction, based on a user input. The personalized voice instruction analysis module 620 may store a personalized voice instruction input by the user in association with the general voice instruction in the personalized instruction set 621. Accordingly, if a general voice instruction is received from the user, the personalized voice instruction analysis module 620 may determine the personalized voice instruction stored in association with the general voice instruction, instead of determining user preference information.

If a general voice instruction is received from the user through a microphone, the personalized voice instruction analysis module 620 may determine a personalized voice instruction as necessary. For example, if the user is identified to be a user of a personalized voice instruction service as a result of identifying the user's voiceprint data, the personalized voice instruction analysis module 620 may determine a personalized voice instruction. As another example, if it is determined that the user belongs to an age group of a teenager or younger as a result of identifying the user's voiceprint data, the personalized voice instruction analysis module 620 may determine a personalized voice instruction.

The personalized voice instruction analysis module 620 may determine a personalized voice instruction, based on user preference information of a user determined through the user data analysis module 610. For example, if a theme corresponding to user preference information 611 of a user belongs to at least one theme included in the personalized instruction set 621, and if a personalized voice instruction corresponding to a general voice instruction received from the user is included, the personalized voice instruction analysis module 620 may determine the personalized voice instruction. The determined personalized voice instruction may be converted into an audio signal through an on-device NLU platform, as described above with reference to FIG. 4, and output through a speaker.

The additional-control action analysis module 630 may produce a plan, based on a general voice instruction received from a user and determine an additional control action to be performed when the electronic device performs an action included in the plan. The additional-control action analysis module 630 may use an additional control action set 631 stored in the memory when determining the additional control action. The additional control action set 631 may include at least one additional control action corresponding to at least one control action classified according to each of at least one theme included in the personalized instruction set 621. For example, the additional control action set 621 may include a list corresponding to each of at least one theme, and each list may include additional control actions corresponding to a control action to be performed by the personalized voice instruction.

If a general voice instruction is received from a user through a microphone, and if a corresponding plan is produced, the additional-control action analysis module 630 may determine an additional control action to be performed together with the action included in the plan as necessary. For example, a processor may receive status information of an external device from each external device in order to determine an additional control action. If a user is reproducing content through at least one external device as a result of analyzing the status information of the external device, the additional-control action analysis module 630 may not determine the additional control action. Alternatively, if an input limiting execution of an additional control action is received from the user of the electronic device, the additional-control action analysis module 630 may not determine the additional control action.

The additional-control action analysis module 630 may determine an additional control action, based on at least one of the control action determined based on a general voice instruction and/or user preference information or status information associated with a user. For example, in the case of a general voice instruction "Turn on the desk lighting device", the additional-control action analysis module 630 may determine, as an additional control action, a control action for adjusting the brightness of the desk lighting device to a level capable of increasing concentration. The electronic device may produce a plan including an action of turning on the desk lighting device, based on the general voice instruction, and further perform the additional control action while performing the action corresponding to the plan. For example, the electronic device may turn on the desk lighting device by setting the brightness to a level sufficient to increase concentration.

The status information associated with the user may include a variety of information. For example, the status information may include the type of control action corresponding to a general voice instruction, the type of device to perform an action based on the control action, the time at which the general voice instruction is received, the location at which a voice instruction is received, or status information of each external device.

The electronic device may further perform an additional control action determined through the additional-control action analysis module 630 while performing a control action corresponding to a general voice instruction.

Figure 7:
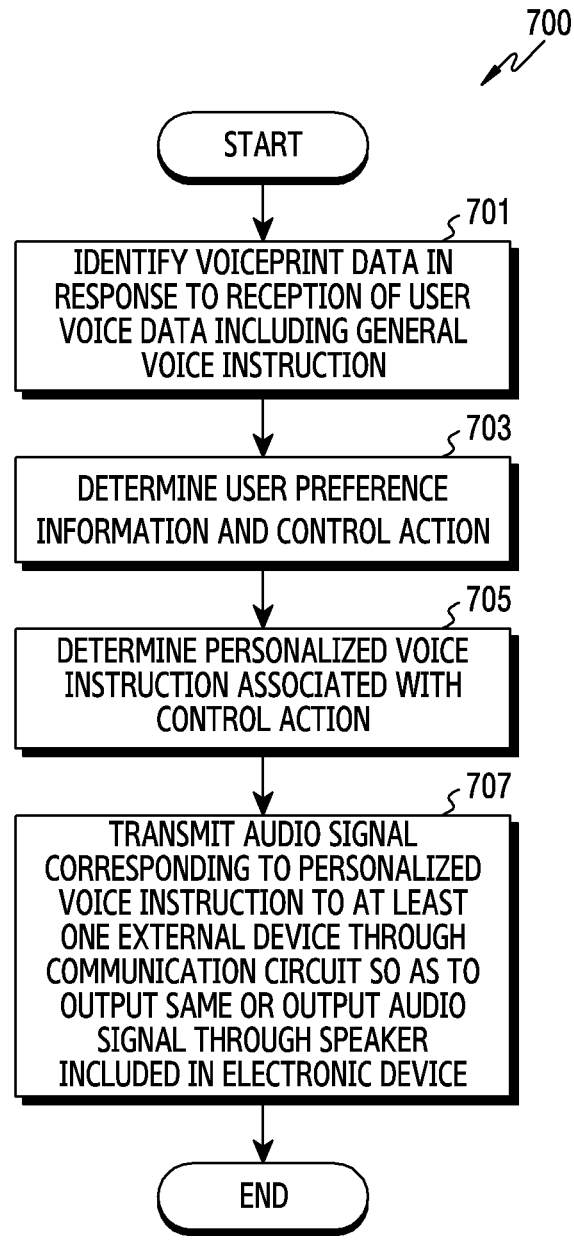
FIG. 7 is a flowchart illustrating an operation in which an electronic device outputs a personalized voice instruction signal and performs an action according to an embodiment.

FIG. 7 is a flowchart 700 illustrating an operation in which an electronic device outputs a personalized voice instruction signal and performs an action according to an embodiment.

Referring to FIG. 7, in operation 701, the electronic device 300 may receive a general voice instruction from a user. The electronic device 300 may convert the received general voice instruction into text data through an on-device NLU platform or an intelligent server. The electronic device 300 may identify voiceprint data in response to reception of user voice data including a general voice instruction. For example, the electronic device 300 may identify voiceprint data corresponding to user's voice data from among at least one piece of voiceprint data corresponding to at least one user, which is stored in the memory 320.

In operation 703, the electronic device 300 may determine user preference information of the user corresponding to the general voice instruction and a control action thereof. The electronic device 300 may identify voiceprint data of the user through the user data analysis module 610 and determine user preference information. The user preference information may include, for example, the type of TV program that the user enjoys watching and the type of music that the user enjoys listening to. If a general utterance processing is set because voiceprint data is not identified, the electronic device 300 may provide a general voice service. Although the user preference information has been described an example above, the user preference information may include various other content, and the disclosure is not limited thereto.

A control action may be determined based on a general voice instruction. For example, the electronic device 300 may convert the general voice instruction into text data and produce at least one plan for performing a task corresponding to the instruction, based on the text data. The plan may be produced by an AI system. The electronic device 300 may perform an operation based on the produced plan. When performing a control action based on the general voice instruction, the electronic device 300 may further perform an additional control action. Alternatively, the electronic device 300 may include an additional control action in the plan.

In operation 705, the electronic device 300 may determine a personalized voice instruction associated with a control action. For example, the electronic device 300 may determine a personalized voice instruction and determine whether or not to output an audio signal, based on the determination result. The electronic device 300 may determine a personalized voice instruction corresponding to a general voice instruction through the personalized voice instruction analysis module 620. If there is no personalized voice instruction corresponding to the general voice instruction or if a general voice instruction is received based on a user that is not a target for outputting a personalized voice instruction, the electronic device 300 may not output the personalized voice instruction.

In operation 707, the electronic device 300 may transmit an audio signal corresponding to the personalized voice instruction to at least one external device through a communication circuit so as to output the same or may output the audio signal through the speaker 340 included in the electronic device 300.

Figure 8:
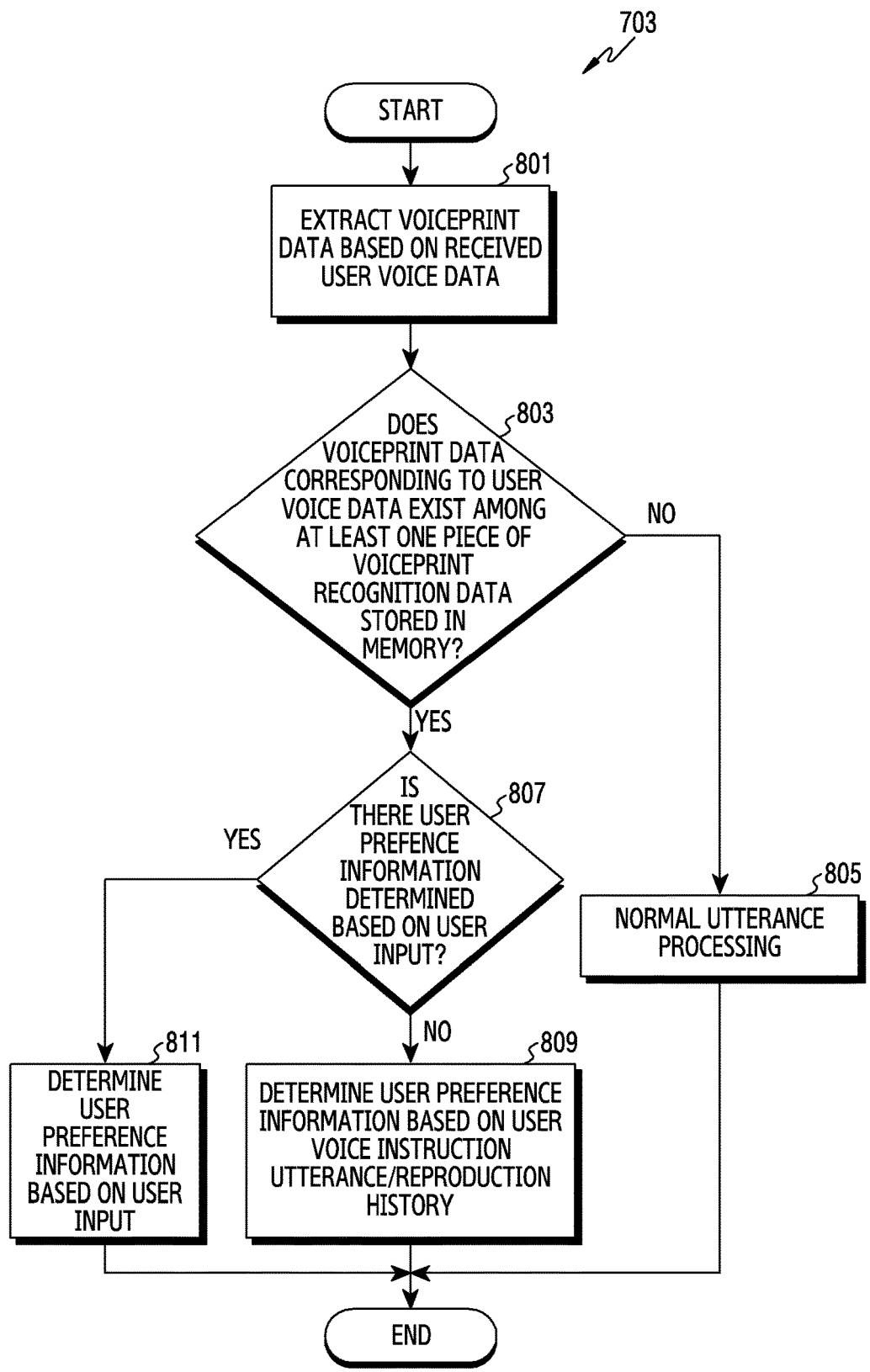
FIG. 8 is a flowchart illustrating an operation in which an electronic device determines user preference information according to an embodiment.

FIG. 8 is a flowchart 703 illustrating an operation in which an electronic device determines user preference information according to an embodiment.

Referring to FIG. 8, in operation 801, the electronic device 300 may extract voiceprint data, based on user voice data received from a user. The electronic device 300 extract voiceprint data of the user by utilizing a module related to voice recognition. For example, the user's voiceprint data may represent an electrical signal produced based on the audio signal of the user.

In operation 803, the electronic device 300 may determine whether or not voiceprint data corresponding to the received user voice data exists in at least one piece of voiceprint recognition data stored in the memory 320. For example, the electronic device 300 may determine whether or not the extracted voiceprint data exists in the voiceprint recognition data corresponding to each of at least one user of the electronic device 300, which is stored in the memory 320. If the extracted voiceprint data exists in the voiceprint recognition data corresponding to each of at least one user, the electronic device 300 may determine that the user is an existing user. Alternatively, the electronic device 300 may determine that the user is an authenticated user. As another example, if the extracted voiceprint data does not exist among the voiceprint recognition data corresponding to each of at least one user stored in the memory 320, the electronic device 300 may determine the user to be a new user. Accordingly, voiceprint data corresponding to the new user may be stored in the memory 320. In addition, the electronic device 300 may determine that the new user is not an authenticated user, and limit some of the actions based on the general voice instruction of the new user.

If the extracted voiceprint data does not exist among the voiceprint recognition data corresponding to each of at least one user in operation 803, the electronic device 300 may process the user's voice data by a normal utterance processing method in operation 805. That is, if there is no voiceprint data of the user, the electronic device 300 may provide a general voice service. For example, if there is no voiceprint data, the electronic device 300 may perform an action based on a general voice instruction included in the received voice data. That is, the electronic device 300 may determine a control action based on the general voice instruction, instead of determining user preference information.

If the extracted voiceprint data exists in the voiceprint recognition data corresponding to each of at least one user in operation 803, the electronic device 300 may determine whether there is user preference information determined based on a user input in operation 807. If the extracted voiceprint data exists, user data 611 related to a user corresponding to the extracted voiceprint data may be included in the memory 320. Accordingly, the processor 310 of the electronic device 300 may determine user preference information using the user data 611. If there is user preference information determined based on a user input in operation 807, the electronic device 300 may determine user preference information, based on the user input in operation 811.

However, when there is no user preference information determined based on a user input in operation 807, the electronic device 300 may determine user preference information based on a user voice instruction utterance/reproduction history in operation 809. For example, if the user executes a plurality of voice instruction utterances related to specific content, or if specific content is reproduced many times as a result of analyzing a reproduction history through at least one external device 530, the electronic device 300 may determine the specific content to be user preference information.

The electronic device 300 may determine user preference information, based on at least one of voice instruction history information of the user, user age information, and preference information input from the user.

Alternatively, an operation in which the electronic device 300 determines user preference information may further include various operations and/or may exclude at least some of operations 801 to 809.

Figure 9:
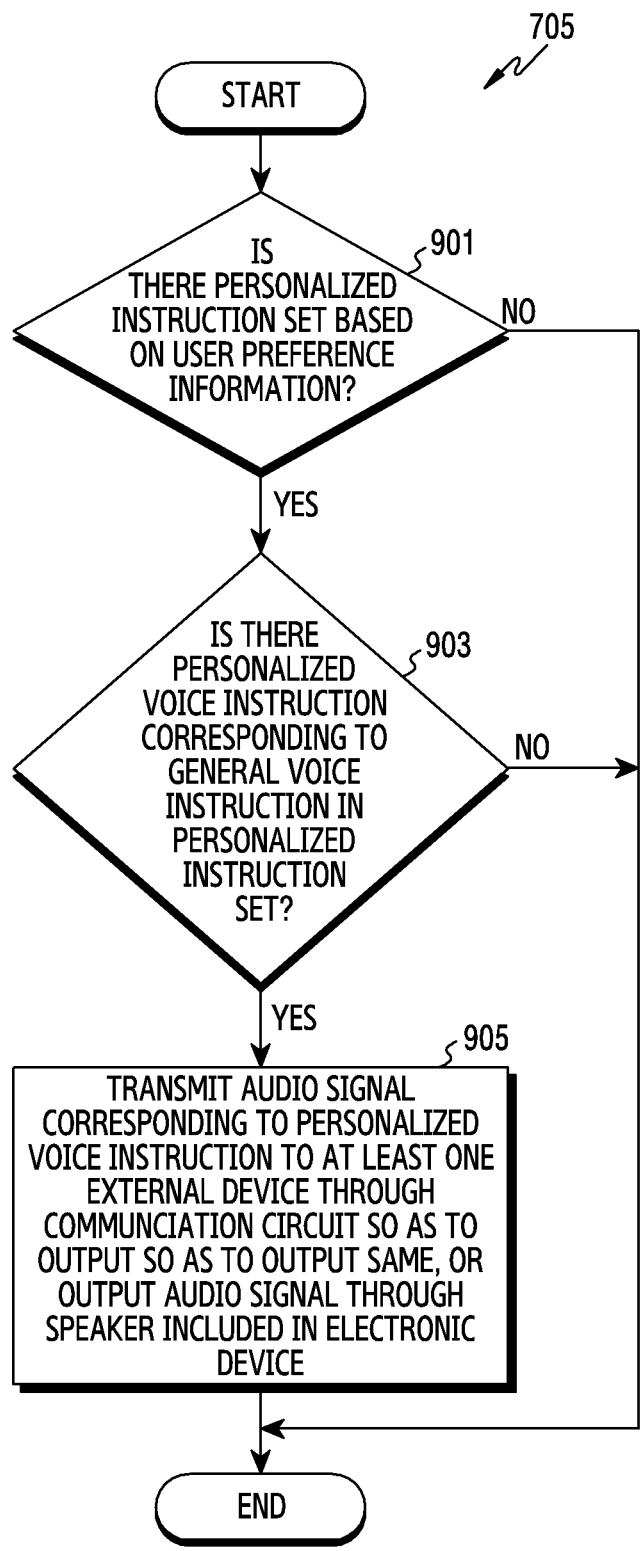
FIG. 9 is a flowchart illustrating an operation in which an electronic device determines a personalized voice instruction according to an embodiment.

FIG. 9 is a flowchart 705 illustrating an operation in which an electronic device determines a personalized voice instruction according to an embodiment.

Referring to FIG. 9, in operation 901, the electronic device 300 may determine whether or not there is a personalized instruction set based on user preference information. For example, the electronic device 300 may determine whether or not a personalized instruction set based on the user preference information determined in operation 703 is stored in the memory 320. According to an embodiment, if there is no personalized instruction set based on the user preference information in operation 901, the electronic device 300 may perform operation 707, instead of performing another operation in operation 705.

When there is a personalized instruction set based on user preference information in operation 901, the electronic device 300 may determine whether or not there is a personalized voice instruction corresponding to a general voice instruction in the personalized instruction set in operation 903. For example, even if a personalized instruction set corresponding to the user preference information is included in the memory 320, the personalized instruction set may not include a personalized voice instruction corresponding to a general voice instruction received from the user. If there is no personalized voice instruction, the electronic device 300 may perform operation 707, instead of performing another operation in operation 705.

When there is a personalized voice instruction corresponding to a general voice instruction in the personalized instruction set in operation 903, the electronic device 300 may transmit an audio signal corresponding to the personalized voice instruction to at least one external device through the communication circuit 350 so as to output the same, or may output the audio signal corresponding to the personalized voice instruction through the speaker 340 included in the electronic device 300 in operation 905. The electronic device 300 may extract TTS data corresponding to the personalized voice instruction through the on-device NLU platform included in the processor 310, and output an audio signal through the speaker 340, based thereon. For example, in response to reception of a user's general voice instruction "Play a cheerful song", the electronic device 300 may output an audio signal "You can just say 'AAA' to 'play a cheerful song'" in the same voice as that of a specific animation character according to the user's user preference information. That is, the electronic device 300 may output an audio signal corresponding to a personalized voice instruction (e.g., "AAA") corresponding to a general voice instruction (e.g., "Play a cheerful song") through the speaker 340.

Figure 10:
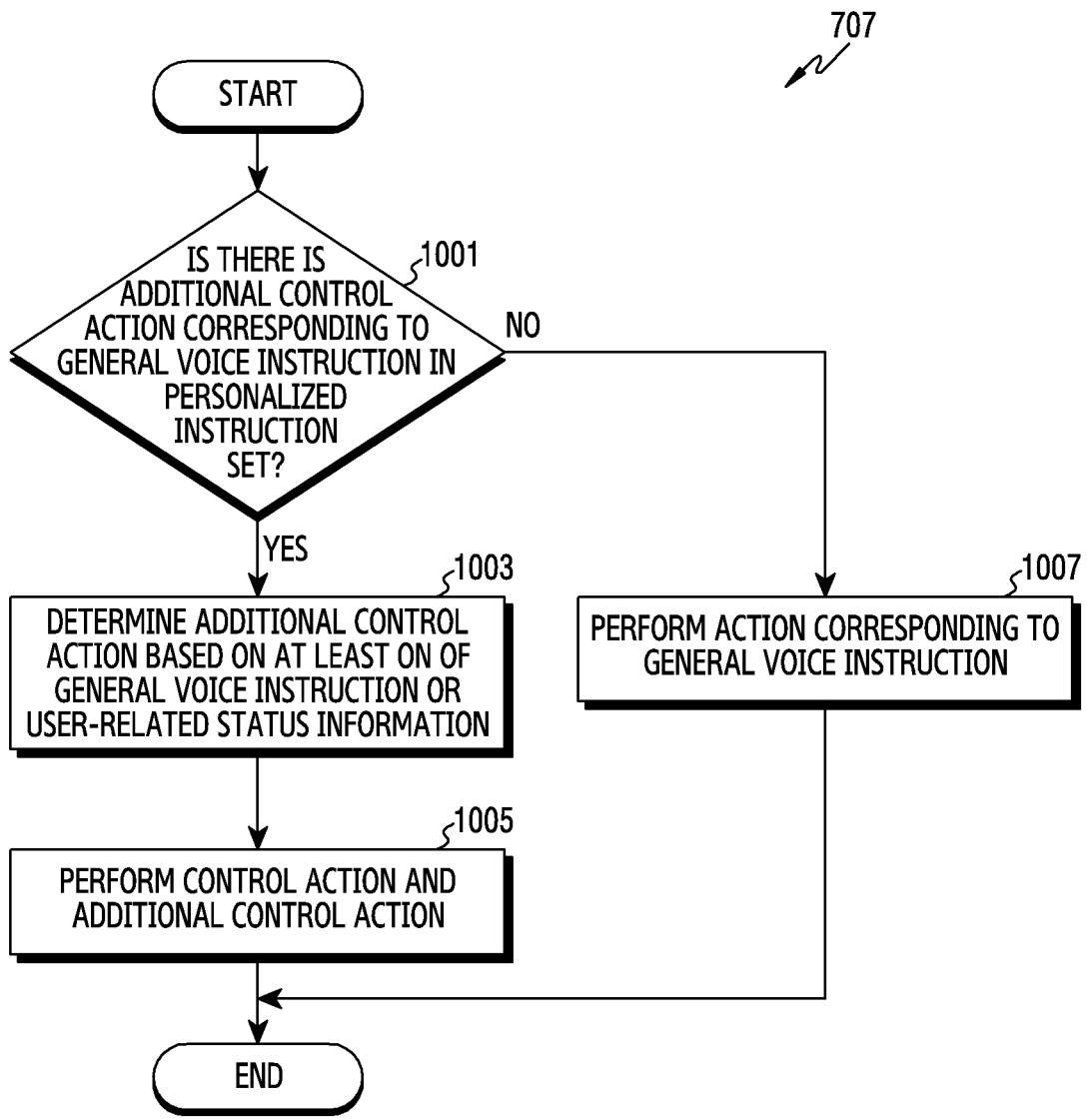
FIG. 10 is a flowchart illustrating an operation in which an electronic device determines an additional control action according to an embodiment.

FIG. 10 is a flowchart 707 illustrating an operation in which an electronic device determines an additional control action according to an embodiment.

Referring to FIG. 10, in operation 1001, the electronic device 300 may determine whether or not there is an additional control action corresponding to a general voice instruction in a personalized instruction set 621. In response to receiving a general voice instruction from the user, the electronic device 300 may determine whether or not there is a personalized instruction set corresponding to a determined user preference information, and determine whether or not the personalized instruction set includes corresponds an additional control action corresponding to the general voice instruction.

For example, the personalized instruction set may include at least one personalized voice instruction corresponding to the general voice instruction and an additional control action corresponding to the general voice instruction depending on each of at least one theme.

If there is no additional control action in operation 1001, the electronic device 300 may perform an action corresponding to the general voice instruction in operation 1007. However, if there is an additional control action in operation 101, the electronic device 300 may determine an additional control action, based on at least one of the general voice instruction or user-related status information in operation 1003. The additional control action corresponding to the general voice instruction may include at least one effect. For example, when determining a control action according to the general voice instruction and performing an action based on the control action, an effect of outputting additional background music and/or an effect of controlling the color of an output screen or light may be included.

The additional control action may be determined depending on the type of device to perform the action based on the control action. For example, even if the additional control action includes the effect of controlling the color of an output screen, the control action may be omitted if the device to perform the action based on the control action does not include a screen output device.

The additional control action may be determined based on status information associated with a user. The status information associated with a user may include a variety of context information. For example, the status information associated with a user may include information about the location, time, day, and date at which the electronic device 300 receives the general voice instruction, and information on the device to perform the action based on the control action. If the electronic device 300 receives the general voice instruction at bedtime and if a user's general voice instruction states "Turn off the light", the additional control action may include an effect of outputting songs good for sleeping, based on the time at which the general voice instruction is received.

In operation 1005, the electronic device 300 may perform a control action and an additional control action. For example, the electronic device 300 may perform a control action corresponding to a general voice instruction including an additional control action. The electronic device 300 may provide user convenience when performing an action corresponding to the general voice instruction using at least one effect. The processor 310 may add an additional control action when producing a plan corresponding to the general voice instruction.

When performing an action based on a control action according to a general voice instruction using an external device, the electronic device 300 may transmit a control signal generated based on the control action and additional control action to the external device. An external device may receive the control signal and perform an operation based on the control action and an additional control action according to the control signal. For example, if the user's general voice instruction states, "Turn off the light" and if the additional control action indicates an effect of outputting songs good for sleeping, an external device (e.g., a lighting device) may turn off the light and output songs good for sleeping.

Figure 11:
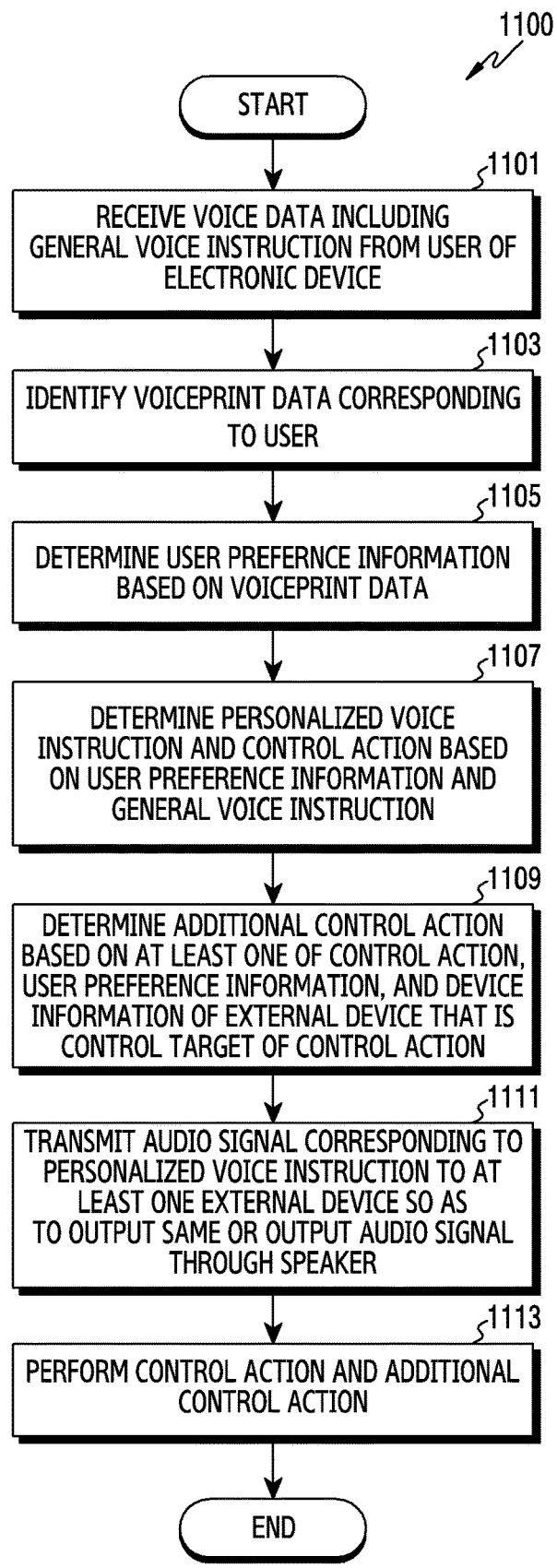
FIG. 11 is a flowchart illustrating the operation of an electronic device according to an embodiment.

FIG. 11 is a flowchart 1100 illustrating the operation of an electronic device according to an embodiment.

Referring to FIG. 11, in operation 1101, the electronic device 300 may receive voice data including a general voice instruction from a user of the electronic device 300. The electronic device 300 may identify voiceprint data corresponding to the user using voiceprint data corresponding to each of at least one user, which is stored in the memory 320, in operation 1103.

In operation 1105, the electronic device 300 may determine user preference information of the user, based on the identified user's voiceprint data. The operation of determining user preference information may include operations similar to those in FIG. 8 as described above.

In operation 1107, the electronic device 300 may determine a personalized voice instruction and a control action, based on the user preference information and the general voice instruction. The electronic device 300 may determine a personalized voice instruction using a personalized-voice instruction analysis module 620. The control action may include actions included in a plan produced based on the general voice instruction.

In operation 1109, the electronic device 300 may determine an additional control action, based on at least one of the control action, the user preference information, and device information of an external device that is a control target of the control action.

In operation 1111, the electronic device 300 may transmit an audio signal corresponding to the personalized voice instruction to at least one external device so as to output the same or may output the audio signal through the speaker 340. When there is no additional control action and personalized voice instruction, operations 1109 and 1111 may be omitted. Operation 1109 may include operations similar to those in FIG. 10 as described above.

In operation 1113, the electronic device 300 may perform the control action and the additional control action. For example, the electronic device 300 may perform an operation corresponding to the general voice instruction including the additional control action. If the additional control action is not determined, the electronic device 300 may perform only an action corresponding to the general voice instruction. For example, if performing an action corresponding to a voice instruction including an additional control action is restricted based on a user input, the electronic device 300 may perform an action corresponding to the voice instruction, excluding the additional control action.

As another example, if there is an external device that is playing content at the time of inputting the general voice instruction, based on the status information of the external device received through the at least one external device 530, the electronic device 300 may perform an action corresponding to a voice instruction, excluding the additional control action.

Figure 12:
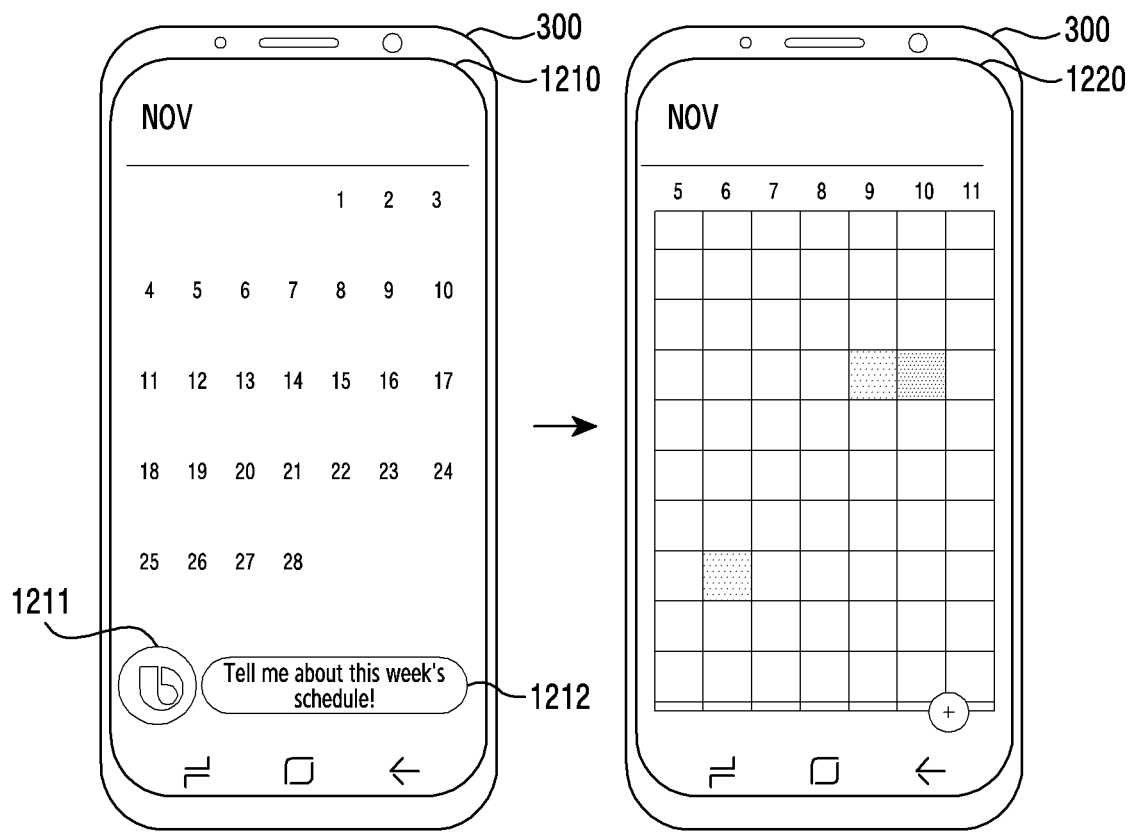
FIG. 12 illustrates an electronic device displaying a screen for processing a voice input received through an intelligent application according to an embodiment.

FIG. 12 illustrates an electronic device displaying a screen for processing a voice input received through an intelligent application according to an embodiment.

Referring to FIG. 12, the electronic device 300 (e.g., the user terminal 100 of FIG. 1) may execute an intelligent app to process a user input through the intelligent server 200.

While displaying screen 1210, if the electronic device 300 recognizes a specified voice input (e.g., "wake up!") or receives an input through a hardware key (e.g., a dedicated hardware key), the electronic device 300 may execute an intelligent app to process the voice input. For example, the electronic device 300 may execute an intelligent app while a schedule app is running. The electronic device 300 may display an object (e.g., an icon) 1211 corresponding to the intelligent app on the display (e.g., the display 140 in FIG. 1). The electronic device 300 may receive a voice input by a user utterance. For example, the electronic device 300 may receive a voice input saying, "Tell me about this week's schedule!". The electronic device 300 may display a user interface (UI) 1212 (e.g., an input window) of the intelligent app in which text data of the received voice input is displayed.

On screen 1220, the electronic device 300 may display a result corresponding to the received voice input on the display. For example, the electronic device 300 may receive a plan corresponding to the received user input, and display "this week's schedule" on the display according to the plan.

Figure 13A:
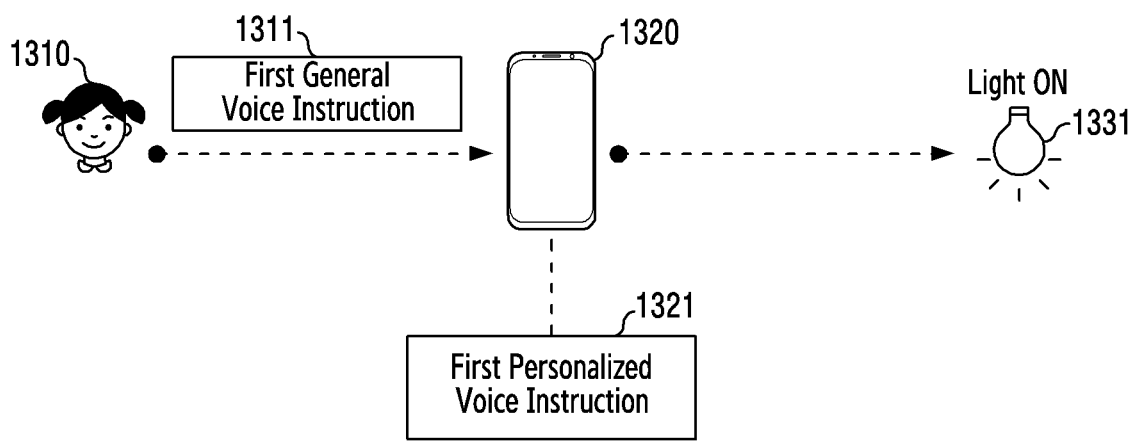
FIG. 13A illustrates an operation of controlling an external device through a voice command according to an embodiment.

FIG. 13A illustrates an operation of controlling an external device through a voice command according to an embodiment.

Referring to FIG. 13A, an electronic device 1320 (e.g., the user terminal 100 in FIG. 1) may receive a first general voice instruction 1311 (e.g., "Turn on the light") from a user 1310.

The electronic device 1320 may determine user preference information of the user 1310, based on the reception of the first general voice instruction 1311, and determine a first personalized voice instruction 1321, based on the user preference information and the first general voice instruction 1311. The electronic device 1320 may output the first personalized voice instruction 1321 as an audio signal, e.g., "Hi! If you say 'ABCD', you can turn on the light". That is, the electronic device 1320 may output the first personalized voice instruction 1321 (e.g., "ABCD") as an audio signal, thereby increasing the usability of a voice service of the user 1310.

The electronic device 1320 may control the operation of a first external device 1331, based on a first general voice instruction 1311 and a first personalized voice instruction 1321. For example, the electronic device 1320 may produce a control signal (e.g., a signal to turn on the light), based on the first general voice instruction 1311 and the first personalized voice instruction 1321, and transmit the produced control signal to the first external device 1331.

The electronic device 1320 may receive a first personalized voice instruction 1321 from the user 1310. In response receiving the first personalized voice instruction 1321, the electronic device 1320 may perform an action corresponding to the first personalized voice instruction 1321. For example, if a first personalized voice instruction 1321 (e.g., "ABCD") is received from the user 1310, the electronic device 1320 may provide a control signal (e.g., a signal to turn on the light) according thereto. The electronic device 1320 may transmit the control signal to the first external device 1331. The first general voice instruction 1311 may perform the same operation, which may be replaced with the first personalized voice instruction 1321. That is, the electronic device 1320 may perform the same operation, based on the reception of the first general voice instruction 1311 or the first personalized voice instruction 1321.

When performing an action based on the first general voice instruction 1311, the electronic device 1320 may further perform an additional control action in addition thereto. The additional control action may be determined through the additional control action analysis module 630. For example, the electronic device 1320 may determine the additional control action, based on the first general voice instruction 1311 (e.g., "Turn on the light") and user preference information. The electronic device 1320 may perform an action based on the additional control action including at least one effect based on user preference information while performing an action to turn on the light. For example, the electronic device 1320 may transmit a control signal to the first external device 1331, and the first external device 1331 may perform an action including an additional control action to output background music based on user preference information while turning on the light.

The electronic device 1320 may determine an additional control action based on status information associated with the user 1310. For example, the status information associated with the user 1310 may include an utterance time of the first general voice instruction 1311 by the user. If the electronic device 1320 receives the first general voice instruction 1311 in the morning, the electronic device 1320 may determine, as an additional control action, the effect of outputting a light having an appropriate brightness for waking up.

The electronic device 1320 may determine a subsequent instruction, based on the first general voice instruction 1311. A subsequent instruction may be determined in various ways. For example, the electronic device 1320 may determine, as a subsequent instruction, an instruction corresponding to a control action matching the control action corresponding to the first general voice instruction. Alternatively, the electronic device 1320 may determine an instruction that is likely to be executed after the first general voice instruction 1311 as a subsequent instruction. The electronic device 1320 may determine the subsequent instruction, based on the voice instruction utterance and/or content reproduction history information stored in the memory 320.

The electronic device 1320 may determine an instruction by which the first general voice instruction 1311 may be applicably used as a subsequent instruction. For example, in the case where the first general voice instruction 1311 is "Turn on the light", the electronic device 1320 may determine changing the light color as a subsequent instruction.

The electronic device 1320 may determine a subsequent personalized instruction corresponding to the subsequent instruction. For example, the electronic device 1320 may determine a subsequent personalized instruction, based on user preference information. The electronic device 1320 may output an audio signal corresponding to a subsequent personalized instruction. Even before receiving a general voice instruction from the user, the electronic device 1320 may output a subsequent personalized instruction as an audio signal, based on the existence of the subsequent personalized instruction.

The electronic device 1320 may receive a personalized voice instruction configuration input corresponding to a general voice instruction from the user 1310. For example, the user 1310 may configure a personalized voice instruction corresponding to the first general voice instruction 1311 as a first personalized voice instruction 1321. If an input for configuring the first personalized voice instruction 1321 is received, the electronic device 1320 may store the first general voice instruction 1311 in the memory 320 in association with the first personalized voice instruction 1321. Accordingly, the electronic device 1320 may perform an action corresponding to the first general voice instruction 1311 through the first personalized voice instruction 1321 received from the user 1310.

Figure 13B:
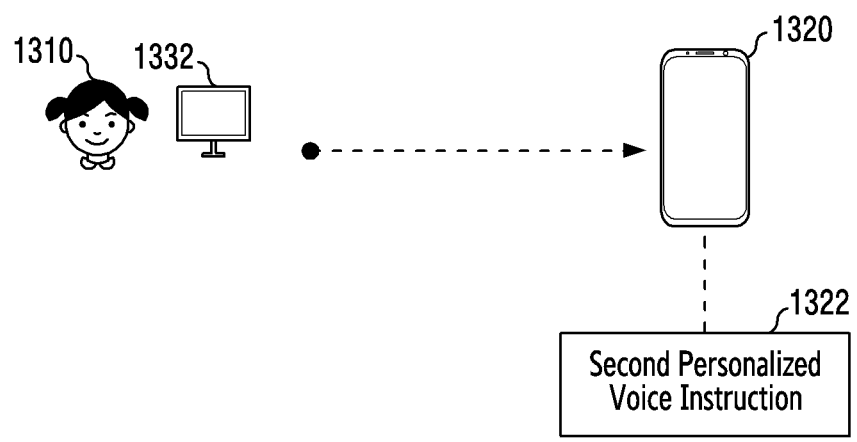
FIG. 13B illustrates an operation of outputting a personalized voice instruction, based on content that is being reproduced, according to an embodiment.

FIG. 13B illustrates an operation of outputting a personalized voice instruction, based on content that is being reproduced, according to an embodiment.

Referring to FIG. 13B, based on the content that is being reproduced through a second external device 1332, the electronic device 1320 may output a second personalized voice instruction 1322 as an audio signal. The user 1310 may reproduce content through the second external device 1332. For example, the user 1310 may watch a broadcast program through the second external device 1332.

The electronic device 1320 may identify that there is a second external device 1332 that is reproducing content, among at least one external device 530. The electronic device 1320 may determine at least one personalized voice instruction (e.g., the second personalized voice instruction 1322), based on the content being reproduced, and output the at least one personalized voice instruction as an audio signal. For example, when a broadcast program is being reproduced in the second external device 1332, the electronic device 1320 may determine the second personalized voice instruction, based on information (e.g., cast lines, etc.) included in the broadcast program being produced.

When outputting a personalized voice instruction, the electronic device 1320 may determine whether or not there is an external device that is reproducing content, among at least one external device 530, based on the status information of the external device. The electronic device 1320 may control the output power of the audio signal corresponding to a personalized voice instruction, based on the determination result. For example, when outputting the second personalized voice instruction 1322, as the user 1310 is watching content through the second external device 1332, the electronic device 1320 may output the second personalized voice instruction 1322 with minimum power so as not to disturb the user watching the content. According to various embodiments, if the user 1310 is likely to be disturbed because there is content that is being reproduced in at least one external device 530, the electronic device 1320 may control the output power of the personalized voice instruction and the additional control action.

Figure 13C:
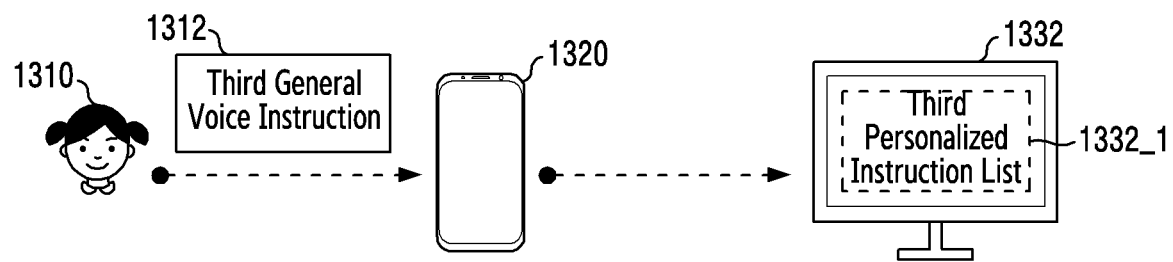
FIG. 13C illustrates an operation of outputting a personalized instruction list through an external device according to an embodiment.

FIG. 13C illustrates an operation of outputting a personalized instruction list through an external device according to an embodiment.

Referring to FIG. 13C, the electronic device 1320 may transmit at least one personalized instruction list corresponding to a personalized voice instruction to an external device including a display, and transmit a control signal such that the external device outputs the at least one personalized instruction list.

The electronic device 1320 may receive a third general voice instruction 1312 from the user 1310. Although different general voice instructions have been used in FIGS. 13A to 13C for convenience of explanation, the same general voice instruction may perform the action in the same manner.

In response to reception of the third general voice instruction 1312, the electronic device 1320 may transmit a control signal to output at least one instruction set corresponding to the third general voice instruction 1312 to the second external device 1332 including a display.

Various personalized voice instructions may be stored in the memory corresponding to the third general voice instruction 1312. The second external device 1332 may output a third personalized instruction list 1332_1, based on the control signal. Accordingly, the user 1310 may obtain information about the personalized voice instruction through the external device, as well as through an audio signal of the electronic device 1320.

Figure 13D:
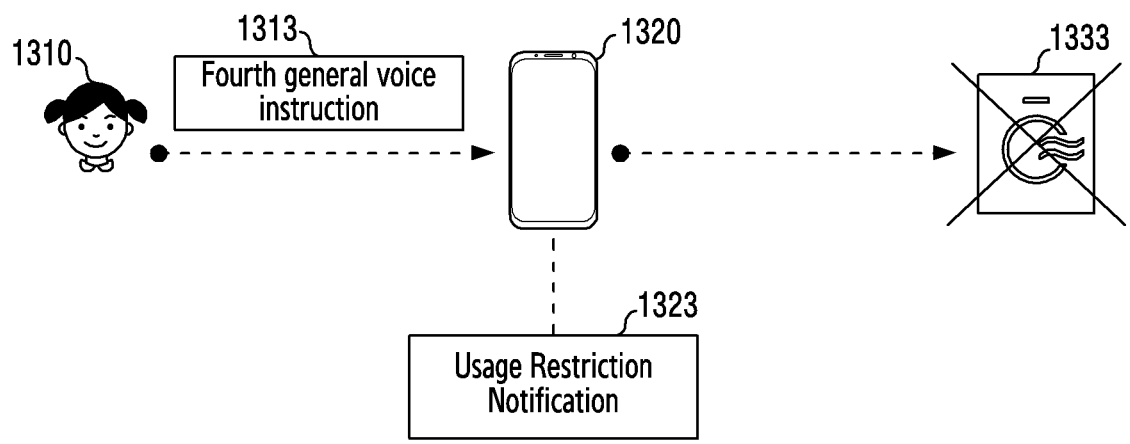
FIG. 13D illustrates an operation of controlling the use of an external device, based on a voice instruction, according to an embodiment.

FIG. 13D illustrates an operation of controlling the use of an external device, based on a voice instruction, according to an embodiment.

Referring to FIG. 13D, the electronic device 1320 may determine whether or not a control action corresponding to a plan produced by a general voice instruction includes a restricted action. In response to the control action including the restricted action, the electronic device 1320 may output a notification regarding the restriction of an action corresponding to the general voice instruction.

The electronic device 1320 may receive a fourth general voice instruction 1313 from the user 1310. The electronic device 1320 may restrict some of control actions available for the user 1310 through a voice instruction service. For example, if the user 1310 is young, the electronic device 1320 may restrict some functions of a voice instruction service of the user 1310.

The electronic device 1320 may receive a fourth general voice instruction 1313 including a restricted action from the user 1310. In response to reception of the fourth general voice instruction 1313, the electronic device 1320 may determine whether or not a restricted action is included in the actions corresponding to the fourth general voice instruction 1313. The electronic device 1320 may restrict an action performed by a third external device 1333 among at least one external device 530. The electronic device 1320 may determine whether or not an action using the third external device 1333 is included in the actions corresponding to the fourth general voice instruction 1313.

If an action using the third external device 1333 is included therein, the electronic device 1320 may output a usage restriction notification 1323. For example, in response to reception of the fourth general voice instruction 1313 including an action of using the third external device 1333 (e.g., a washing machine) from the user 1310, the electronic device 1320 may output a usage restriction notification 1323 stating "Sir, spin-drying action of the washing machine according to your voice instruction cannot be performed".

In response to reception of the fourth general voice instruction 1313 from the user 1310, the electronic device 1320 may transmit a control signal that provides a notification to each of the external devices available for the user 1310 to perform an action using the fourth general voice instruction 1313. For example, in response to reception of the fourth general voice instruction 1313 from the user 1310, the electronic device 1320 may provide a notification as to the external device available for the user 1310, among at least one external device 530 connected to the electronic device 1320. The electronic device 1320 may transmit a control signal such that an external device available for the user 1310, among at least one external device, provides a notification through sound.

Figure 14:
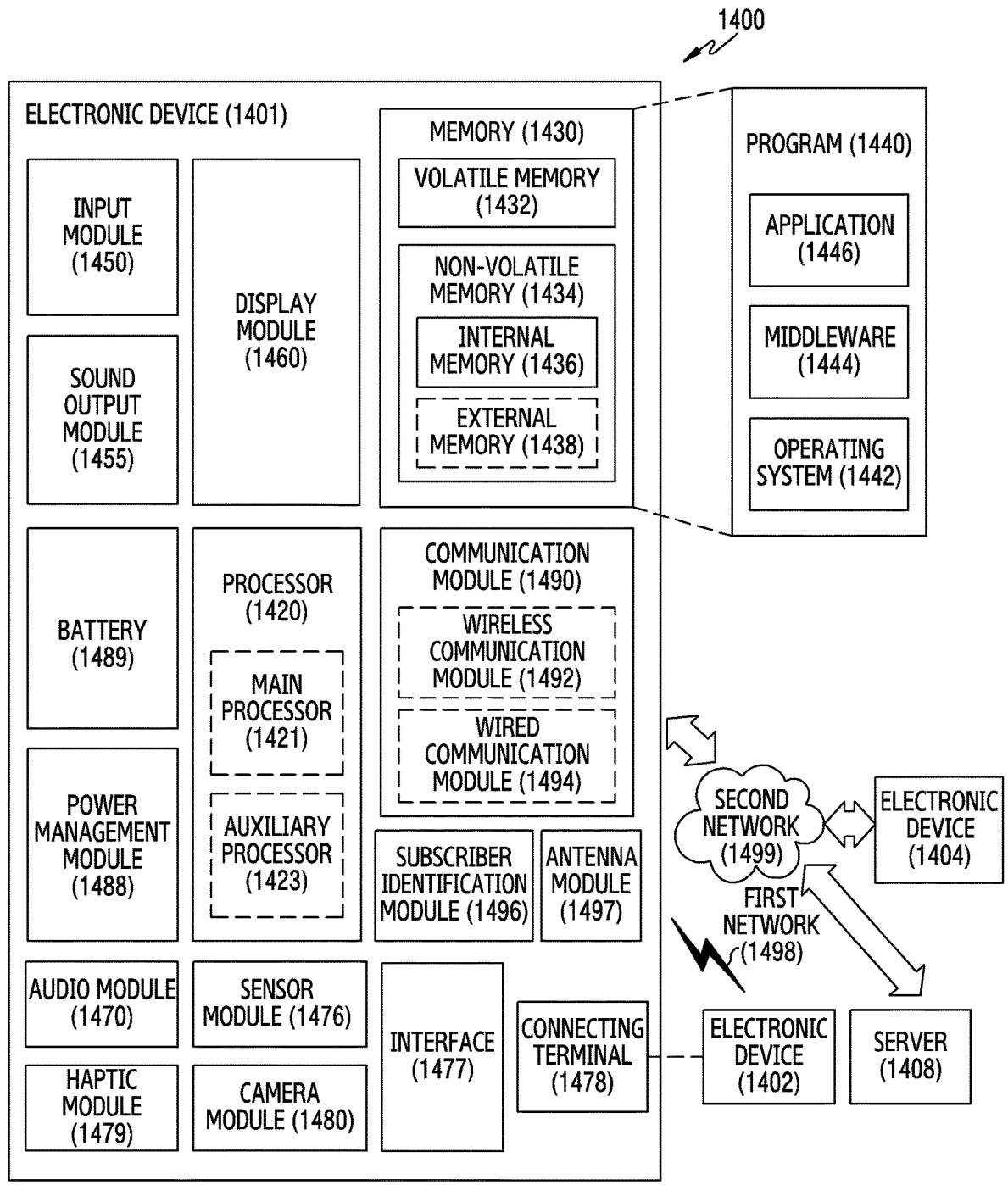
FIG. 14 illustrates an electronic device in a network environment according to an embodiment.

FIG. 14 illustrates an electronic device in a network environment according to an embodiment.

Referring to FIG. 14, an electronic device 1401 in a network environment 1400 may communicate with an electronic device 1402 via a first network 1498 (e.g., a short-range wireless communication network), or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In some embodiments, at least one of the components (e.g., the 1414 connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460). 1414

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a CPU or an AP), or an auxiliary processor 1423 (e.g., a GPU, a neural processing unit (NPU), an image signal processor (ISP), a sensor hub processor, or a CP) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an ISP or a CP) may be implemented as part of another component (e.g., the camera module 1480 or the communication module 1490) functionally related to the auxiliary processor 1423. According to an embodiment, the auxiliary processor 1423 (e.g., the NPU) may include a hardware structure specified for AI model processing. An AI model may be generated by machine learning. Such learning may be performed, e.g., by the electronic device 1401 where the AI is performed or via a separate server (e.g., the server 1408). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), an RNN, a restricted Boltzmann machine (RBM), a deep belief network (DBN), a bidirectional recurrent DNN (BRDNN), deep Q-network, or a combination of two or more thereof but is not limited thereto. The AI model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, ISPs, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more CPs that are operable independently from the processor 1420 (e.g., the AP) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or IR data association (IrDA)) or the second network 1499 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the SIM 1496.

The wireless communication module 1492 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or MEC. In another embodiment, the external electronic device 1404 may include an IoT device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an ASIC.

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 300 in FIG. 3) may include a memory (e.g., the memory 320 in FIG. 3) configured to store at least one piece of voiceprint data corresponding to at least one user, a communication circuit (e.g., the communication circuit 350 in FIG. 3) configured to transmit a signal for controlling at least one external device, and at least one processor (e.g., the processor 310 in FIG. 3) electrically connected to the memory and the communication circuit, wherein the at least one processor may be configured to identify voiceprint data corresponding to the user from among the at least one piece of voiceprint data, based on received user voice data, identify a general voice instruction included in the received user voice data, determine user preference information of the user, based on the identified voiceprint data, determine a control action for determining an action to be performed in the at least one external device or the electronic device, based on the general voice instruction identified from the received user voice data, determine a personalized voice instruction, based on at least one of the control action and the user preference information, and transmit an audio signal corresponding to the personalized voice instruction to the at least one external device through the communication circuit so as to output the same, or output the audio signal through a speaker included in the electronic device.

The memory may store the control action in association with at least one of the personalized voice instruction or the user preference information, and the at least one processor may be configured to retrieve the personalized voice instruction stored in association with at least one of the control action and the user preference information in response to determination of the control action and the user preference information.

The at least one processor may be configured to determine an additional control action, based on at least one of the control action, the user preference information, or device information of a first external device that is a target of the control action, and control the memory to store the additional control action in association with the personalized voice instruction.

The at least one processor may be configured to generate a control signal for controlling the first external device to perform the control action and the additional control action, and transmit the control signal to the first external device through the communication circuit.

The at least one processor may be configured to store, in the memory, voice instruction history information and age information corresponding to each of the at least one user, or preference information input from each of the at least one user, and determine the user preference information, based on at least one piece of voice instruction history information of the user among the at least one user, age information of the user, and preference information input from the user.

The at least one processor may be configured to determine the additional control action, based on at least one of the control action, the device information of the first external device, a time at which the user voice data is received, and location information of an electronic device when the user voice data is received.

The at least one processor may be configured to receive status information of an external device for each of the at least one external device using the communication circuit.

The at least one processor may be configured to determine whether or not there is an external device that is reproducing content, among the at least one external device, based on the status information of the external device, and control the output power of the audio signal, based on a result of the determination.

The at least one processor may be configured to determine whether or not there is a device that is reproducing content, among the at least one external device, based on the status information of the external device, determine a content voice instruction, based on the content being reproduced, and transmit an audio signal corresponding to the content voice instruction to the at least one external device through the communication circuit so as to output the same, or output the audio signal through the speaker, and the content voice instruction may be determined based on information included in the content being reproduced.

The at least one processor may be configured to determine a subsequent instruction to be used after using the general voice instruction, based on the general voice instruction, determine a subsequent personalized instruction, based on the subsequent instruction and the user preference information, and transmit a subsequent audio signal corresponding to the subsequent personalized instruction to the at least one external device through the communication circuit so as to output the same, or output the subsequent audio signal through the speaker, and the subsequent instruction may include an instruction uttered by the user after the general voice instruction.

The at least one processor may be configured to determine whether or not the control action includes a restricted action requiring an authentication action for the user of the electronic device, and in response to the control action including the restricted action as a result of the determination, control the speaker to output a notification regarding restriction of the action corresponding to the general voice instruction.

The at least one processor may be configured to receive a user input for configuring at least one personalized voice instruction corresponding to at least one general voice instruction stored in the memory, and control the memory to store the at least one personalized voice instruction in association with the at least one general voice instruction.

The at least one processor may be configured to transmit at least one personalized instruction list corresponding to the general voice instruction to an external device including a display, among the at least one external device, using the communication circuit, and transmit a list output signal such that the external device including the display outputs the at least one personalized instruction list.

As described above, an operating method of an electronic device (e.g., the electronic device 300 in FIG. 3) including a memory (e.g., the memory 320 in FIG. 3) configured to store at least one piece of voiceprint data corresponding to at least one user and a communication circuit (e.g., the communication circuit 350 in FIG. 3) configured to transmit a signal for controlling at least one external device may include receiving user voice data, identifying voiceprint data corresponding to the user from among the at least one piece of voiceprint data, identifying a general voice instruction included in the received user voice data, determining user preference information of the user, based on the identified voiceprint data, determining a control action based on an action to be performed in the at least one external device or the electronic device, based on the general voice instruction, determining a personalized voice instruction, based on at least one of the control action and the user preference information, and transmitting an audio signal corresponding to the personalized voice instruction to the at least one external device through the communication circuit so as to output the same, or outputting the audio signal through a speaker included in the electronic device.

The operating method of an electronic device may further include storing the control action in association with at least one of the personalized voice instruction and the user preference information, and in response to determination of the control action and the user preference information, retrieving the personalized voice instruction stored in association with at least one of the control action and the user preference information.

The method may further include determining an additional control action, based on at least one of the control action, the user preference information, or device information of a first external device that is a target of the control action, storing the additional control action in association with the personalized voice instruction, generating a control signal for controlling the first external device to perform the control action and the additional control action, and transmitting the control signal to the first external device through the communication circuit.

The operating method of an electronic device may further include storing, in the memory, voice instruction history information and age information corresponding to each of the at least one user, or preference information input from each of the at least one user, and determining the user preference information, based on at least one piece of voice instruction history information of the user among the at least one user, age information of the user, and preference information input from the user.

The operating method of an electronic device may further include receiving status information of an external device for each of the at least one external device using the communication circuit, determining whether or not there is an external device that is reproducing content, among the at least one external device, based on the status information of the external device, and controlling the output power of the audio signal, based on a result of the determination.

The operating method of an electronic device may further include determining a subsequent instruction to be used after using the general voice instruction, based on the general voice instruction, determining a subsequent personalized instruction, based on the subsequent instruction and the user preference information, and transmitting a subsequent audio signal corresponding to the subsequent personalized instruction to the at least one external device through the communication circuit so as to output the same, or outputting the subsequent audio signal through the speaker, wherein the subsequent instruction may include an instruction uttered by the user after the general voice instruction.

The operating method of an electronic device may further include receiving a user input for configuring at least one personalized voice instruction corresponding to at least one general voice instruction stored in the memory, and storing the at least one personalized voice instruction in association with the at least one general voice instruction.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   memory storing at least one piece of voiceprint data corresponding to each of at least one user;
   communication circuitry configured to communicate with at least one external device; and
   at least one processor electrically connected to the memory and the communication circuitry,
   wherein the at least one processor is configured to
   identify voiceprint data corresponding to the user from among the at least one piece of voiceprint data, based on received user voice data,
      identify a general voice instruction included in the received user voice data,
      determine user preference information of the user, based on the identified voiceprint data,
      determine a control action for determining an action to be performed in the at least one external device or the electronic device, based on the general voice instruction identified from the received user voice data,
      determine a personalized voice instruction, based on at least one of the control action or the user preference information, and
      transmit, through the communication circuitry, to the at least one external device, an audio signal corresponding to the personalized voice instruction to be output by the at least one external device, or output the audio signal through a speaker included in the electronic device.

2. The electronic device of claim 1, wherein the memory stores the control action in association with at least one of the personalized voice instruction or the user preference information, and
   wherein the at least one processor is further configured to retrieve the personalized voice instruction stored in association with at least one of the control action or the user preference information in response determining the control action and the user preference information.

3. The electronic device of claim 1, wherein the at least one processor is further configured to:
   determine an additional control action, based on at least one of the control action, the user preference information, or device information of a first external device that is a target of the control action, and
   control the memory to store the additional control action in association with the personalized voice instruction.

4. The electronic device of claim 3, wherein the at least one processor is further configured to:
   generate a control signal for controlling the first external device to perform the control action and the additional control action, and transmit the control signal to the first external device through the communication circuitry.

5. The electronic device of claim 1, wherein the at least one processor is further configured to:
store, in the memory, voice instruction history information and age information corresponding to each of the at least one user, or preference information input from each of the at least one user, and
determine the user preference information, based on at least one piece of voice instruction history information of the user among the at least one user, age information of the user, and preference information input from the user.

6. The electronic device of claim 3, wherein the at least one processor is further configured to determine the additional control action, based on at least one of the control action, the device information of the first external device, a time at which the user voice data is received, or location information of the electronic device when the user voice data is received.

7. The electronic device of claim 1, wherein the at least one processor is further configured to receive status information of an external device for each of the at least one external device using the communication circuitry.

8. The electronic device of claim 7, wherein the at least one processor is further configured to:
determine whether an external device is reproducing content, among the at least one external device, based on the status information of the external device, and
control the output power of the audio signal, based on a result of the determination.

9. The electronic device of claim 7, wherein the at least one processor is further configured to:
determine whether an external device is reproducing content, among the at least one external device, based on the status information of the external device,
determine a content voice instruction, based on the content being reproduced, and
transmit, through the communication circuitry, to the at least one external device, an audio signal corresponding to the content voice instruction to be output, or output the audio signal through the speaker, and
wherein the content voice instruction is determined based on information included in the content being reproduced.

10. The electronic device of claim 1, wherein the at least one processor is further configured to:
determine a subsequent instruction to be used after using the general voice instruction, based on the general voice instruction,
determine a subsequent personalized instruction, based on the subsequent instruction and the user preference information, and
transmit, to the at least one external device, through the communication circuitry, a subsequent audio signal corresponding to the subsequent personalized instruction to be output by the at least one external device, or output the subsequent audio signal through the speaker, and
wherein the subsequent instruction includes an instruction spoken by the user after the general voice instruction.

11. The electronic device of claim 1, wherein the at least one processor is further configured to:
determine whether the control action includes a restricted action requiring an authentication action for the user of the electronic device, and
in response to the control action including the restricted action as a result of the determination, control the speaker to output a notification regarding restriction of the action corresponding to the general voice instruction.

12. The electronic device of claim 1, wherein the at least one processor is further configured to:
receive a user input for configuring a personalized voice instruction corresponding to a general voice instruction stored in the memory, and
control the memory to store the personalized voice instruction in association with the general voice instruction.

13. The electronic device of claim 1, wherein the external device includes a display, and
wherein the processor is further configured to:
transmit, to an external device comprising a display, using the communication circuitry, a personalized instruction list corresponding to the general voice instruction, and
transmit a list output signal instructing the external device to display the personalized instruction list using the display.

14. A method performed by an electronic device including memory storing at least one piece of voiceprint data corresponding to at least one user and a communication circuitry configured to communicate with at least one external device, the method comprising:
receiving user voice data;
identifying voiceprint data corresponding to the user from among the at least one piece of voiceprint data, based on received user voice data;
identifying a general voice instruction included in the received user voice data;
determining user preference information of the user, based on the identified voiceprint data;
determining a control action based on an action to be performed in the at least one external device or the electronic device, based on the general voice instruction;
determining a personalized voice instruction, based on at least one of the control action or the user preference information; and
transmitting, to the at least one external device, through the communication circuitry, an audio signal corresponding to the personalized voice instruction to be output by the at least one external device, or outputting the audio signal through a speaker included in the electronic device.

15. The method of claim 14, further comprising:
storing the control action in association with at least one of the personalized voice instruction or the user preference information; and
in response determining the control action and the user preference information, retrieving the personalized voice instruction stored in association with at least one of the control action or the user preference information.

16. The method of claim 14, further comprising:
determining an additional control action, based on at least one of the control action, the user preference information, or device information of a first external device that is a target of the control action;
storing the additional control action in association with the personalized voice instruction;
generating a control signal for controlling the first external device to perform the control action and the additional control action; and transmitting the control signal to the first external device through the communication circuitry.

17. The method of claim 14, further comprising:

storing, in the memory, voice instruction history information and age information corresponding to each of the at least one user, or preference information input from each of the at least one user; and determining the user preference information, based on at least one piece of voice instruction history information of the user among the at least one user, age information of the user, and preference information input from the user.

18. The method of claim 14, further comprising:

receiving status information of an external device for each of the at least one external device using the communication circuitry;

determining whether an external device is reproducing content, among the at least one external device, based on the status information of the external device; and controlling the output power of the audio signal, based on a result of the determination.

19. The method of claim 14, further comprising:

determining a subsequent instruction to be used after using the general voice instruction, based on the general voice instruction;

determining a subsequent personalized instruction, based on the subsequent instruction and the user preference information; and transmitting, to the at least one external device, through the communication circuitry, a subsequent audio signal corresponding to the subsequent personalized instruction to be output by the at least one external device, or outputting the subsequent audio signal through the speaker, wherein the subsequent instruction includes an instruction spoken by the user after the general voice instruction.

20. The method of claim 14, further comprising:

receiving a user input for configuring a personalized voice instruction corresponding to a general voice instruction stored in the memory; and storing the personalized voice instruction in association with the general voice instruction.

* * * * *